United States Patent
Quanci et al.

(10) Patent No.: US 12,403,529 B2
(45) Date of Patent: Sep. 2, 2025

(54) USE OF A BASIC OXYGEN FURNACE TO PRODUCE GRANULATED METALLIC UNITS, AND ASSOCIATED SYSTEMS, DEVICES, AND METHODS

(71) Applicant: SUNCOKE TECHNOLOGY AND DEVELOPMENT LLC, Lisle, IL (US)

(72) Inventors: John Francis Quanci, Haddonfield, NJ (US); John Michael Richardson, Devon, PA (US); Patrick James Mullarkey, Manhattan, IL (US); David James Schwake, Aurora, IL (US); Andrew Michael Butor, Cranberry Township, PA (US); Jonathan Hale Perkins, Lisle, IL (US); Chun Wai Choi, Lisle, IL (US)

(73) Assignee: SUNCOKE TECHNOLOGY AND DEVELOPMENT LLC, Lisle, IL (US)

( * ) Notice: Subject to any disclaimer, the term of this patent is extended or adjusted under 35 U.S.C. 154(b) by 0 days.

(21) Appl. No.: 18/882,661

(22) Filed: Sep. 11, 2024

(65) Prior Publication Data
US 2025/0083230 A1 Mar. 13, 2025

Related U.S. Application Data

(60) Provisional application No. 63/581,946, filed on Sep. 11, 2023.

(51) Int. Cl.
*C21C 5/46* (2006.01)
*B22D 41/12* (2006.01)
(Continued)

(52) U.S. Cl.
CPC .............. *B22F 1/05* (2022.01); *B22D 41/12* (2013.01); *B22F 9/04* (2013.01); *B22F 9/08* (2013.01);
(Continued)

(58) Field of Classification Search
None
See application file for complete search history.

(56) References Cited

U.S. PATENT DOCUMENTS

| 2,052,783 | A | | 9/1936 | Mart |
| 3,316,075 | A | * | 4/1967 | Grady ...................... F27D 3/15 |
| | | | | 65/159 |

(Continued)

FOREIGN PATENT DOCUMENTS

| CN | 1847411 A | 10/2006 |
| CN | 101301683 A | 11/2008 |

(Continued)

OTHER PUBLICATIONS

English translation of CN 112305944 (originally published Feb. 2, 2021), obtained from PE2E search.*

(Continued)

*Primary Examiner* — George Wyszomierski
(74) *Attorney, Agent, or Firm* — Perkins Coie LLP; Vijay S. Kumar

(57) ABSTRACT

Systems and methods for using a liquid hot metal processing unit to produce granulated metallic units (GMUs) are disclosed herein. In some embodiments of the present technology, a liquid hot metal processing system for producing GMUs comprises a liquid hot metal processing unit including a granulator unit. The granulator unit can include a tilter positioned to receive and tilt a ladle, a controller operably coupled to the tilter to control tilting of the ladle, a tundish positioned to receive the molten metallics from the ladle, and a reactor positioned to receive the molten metallics from the tundish. The reactor can be configured to cool the molten metallics to form granulated metallic units (GMUs).

13 Claims, 15 Drawing Sheets

(51) Int. Cl.

| | | |
|---|---|---|
| *B22F 1/05* | (2022.01) | |
| *B22F 9/04* | (2006.01) | |
| *B22F 9/08* | (2006.01) | |
| *B61D 7/02* | (2006.01) | |
| *B61D 7/32* | (2006.01) | |
| *B61D 17/18* | (2006.01) | |
| *B61K 13/00* | (2006.01) | |
| *C02F 1/52* | (2023.01) | |
| *C21B 5/00* | (2006.01) | |
| *C21B 7/14* | (2006.01) | |
| *C21B 13/00* | (2006.01) | |
| *C21C 5/50* | (2006.01) | |
| *C21C 5/52* | (2006.01) | |
| *C21C 7/00* | (2006.01) | |
| *C21C 7/064* | (2006.01) | |
| *C21C 7/068* | (2006.01) | |
| *C22C 33/00* | (2006.01) | |
| *C22C 33/02* | (2006.01) | |
| *C22C 38/00* | (2006.01) | |
| *C22C 38/02* | (2006.01) | |
| *C22C 38/04* | (2006.01) | |
| *G01G 13/00* | (2006.01) | |
| *B22F 9/00* | (2006.01) | |
| *B61D 7/00* | (2006.01) | |
| *C02F 101/20* | (2006.01) | |
| *C02F 103/02* | (2006.01) | |
| *C02F 103/10* | (2006.01) | |
| *C02F 103/16* | (2006.01) | |

(52) U.S. Cl.
CPC ............... *B61D 7/02* (2013.01); *B61D 7/32* (2013.01); *B61D 17/18* (2013.01); *B61K 13/00* (2013.01); *C02F 1/52* (2013.01); *C21B 5/008* (2013.01); *C21B 7/14* (2013.01); *C21B 13/0006* (2013.01); *C21C 5/52* (2013.01); *C21C 5/527* (2013.01); *C21C 7/0006* (2013.01); *C21C 7/0075* (2013.01); *C21C 7/064* (2013.01); *C21C 7/068* (2013.01); *C22C 33/006* (2013.01); *C22C 33/0257* (2013.01); *C22C 33/0264* (2013.01); *C22C 33/0271* (2013.01); *C22C 38/002* (2013.01); *C22C 38/02* (2013.01); *C22C 38/04* (2013.01); *G01G 13/006* (2013.01); *B22F 2009/001* (2013.01); *B22F 2009/0808* (2013.01); *B22F 2301/35* (2013.01); *B22F 2304/15* (2013.01); *B22F 2998/10* (2013.01); *B22F 2999/00* (2013.01); *B61D 7/00* (2013.01); *C02F 2101/20* (2013.01); *C02F 2101/203* (2013.01); *C02F 2103/023* (2013.01); *C02F 2103/10* (2013.01); *C02F 2103/16* (2013.01); *C02F 2209/40* (2013.01); *C02F 2301/02* (2013.01); *Y10T 428/2982* (2015.01)

(56) References Cited

U.S. PATENT DOCUMENTS

| | | | | |
|---|---|---|---|---|
| 3,548,919 | A | * | 12/1970 | Gyongyos ............ B22D 11/064 164/434 |
| 3,720,404 | A | * | 3/1973 | Carlson .................... C21C 5/30 75/375 |
| 3,810,542 | A | | 5/1974 | Gloster et al. |
| 3,888,956 | A | | 6/1975 | Klint |
| 3,898,037 | A | | 8/1975 | Lange et al. |
| 3,923,935 | A | | 12/1975 | Cates |
| 4,139,369 | A | | 2/1979 | Kandler et al. |
| 4,153,965 | A | * | 5/1979 | Merly ................ B22D 41/001 15/104.096 |
| 4,294,784 | A | | 10/1981 | Mailund |
| 4,330,511 | A | | 5/1982 | Nelson et al. |
| 4,402,884 | A | | 9/1983 | Koike et al. |
| 4,416,707 | A | | 11/1983 | Foster et al. |
| 4,546,907 | A | | 10/1985 | Kemble |
| 4,694,886 | A | | 9/1987 | Sakaguchi |
| 4,786,322 | A | * | 11/1988 | Green ...................... C21C 1/10 75/312 |
| 4,893,568 | A | | 1/1990 | Adams |
| 5,017,218 | A | | 5/1991 | Lundström et al. |
| 5,084,093 | A | | 1/1992 | Yamaoka et al. |
| 5,458,671 | A | | 10/1995 | Butler et al. |
| 5,552,058 | A | | 9/1996 | Fanning |
| 5,673,779 | A | | 10/1997 | Spickelmire |
| 6,041,906 | A | | 3/2000 | Howard |
| 6,287,362 | B1 | | 9/2001 | Levey et al. |
| 8,646,700 | B2 | | 2/2014 | Lundström et al. |
| 9,840,746 | B2 | | 12/2017 | Lundström |
| 10,486,234 | B2 | | 11/2019 | Lundström |
| 10,618,112 | B2 | | 4/2020 | Lundström |
| 2001/0002535 | A1 | | 6/2001 | Liebig et al. |
| 2002/0026967 | A1 | | 3/2002 | Buenemann et al. |
| 2003/0015315 | A1 | | 1/2003 | Atsushi et al. |
| 2003/0164062 | A1 | | 9/2003 | Lundstrom et al. |
| 2005/0133192 | A1 | | 6/2005 | Meszaros et al. |
| 2009/0015028 | A1 | | 1/2009 | Zamorano |
| 2009/0171512 | A1 | | 7/2009 | Duncan |
| 2013/0180360 | A1 | | 7/2013 | Kim et al. |
| 2015/0330725 | A1 | | 11/2015 | Gurney |
| 2020/0122237 | A1 | * | 4/2020 | Kemper ................ C21C 7/0087 |

FOREIGN PATENT DOCUMENTS

| | | | |
|---|---|---|---|
| CN | 102700957 | A | 10/2012 |
| CN | 103661440 | B | 1/2016 |
| CN | 205496553 | U | 8/2016 |
| CN | 107385135 | A | 11/2017 |
| CN | 207205279 | U | 4/2018 |
| CN | 212049627 | U | 12/2020 |
| CN | 112305944 | A * | 2/2021 |
| CN | 113549715 | A | 10/2021 |
| CN | 214470214 | U | 10/2021 |
| CN | 113828788 | A | 12/2021 |
| CN | 114433854 | A | 5/2022 |
| CN | 216709283 | U | 6/2022 |
| CN | 115417184 | A | 12/2022 |
| CN | 115889716 | A | 4/2023 |
| CN | 116550982 | A | 8/2023 |
| GB | 1287510 | * | 8/1972 |
| JP | H02236212 | A | 9/1990 |
| JP | H06212212 | A | 8/1994 |
| JP | 2001107118 | A | 4/2001 |
| JP | 2002282866 | A | 10/2002 |
| JP | 2005154847 | A | 6/2005 |
| JP | 2020164992 | A | 10/2020 |
| JP | 7033949 | B2 | 3/2022 |
| JP | 2022149432 | A * | 10/2022 |
| KR | 20010111750 | A | 12/2001 |
| KR | 100370611 | B1 | 2/2003 |
| KR | 100847667 | B1 | 7/2008 |
| KR | 101086315 | B1 | 11/2011 |
| KR | 101091977 | B1 | 12/2011 |
| KR | 20130076110 | A | 7/2013 |
| KR | 20140102742 | A | 8/2014 |
| KR | 20140120631 | A | 10/2014 |
| KR | 20160034000 | A | 3/2016 |
| KR | 101649584 | B1 | 8/2016 |
| KR | 20230028951 | A | 3/2023 |
| WO | 2007105039 | A2 | 9/2007 |

OTHER PUBLICATIONS

English translation of JP 2022149432 (originally published Oct. 6, 2022), obtained from PE2E search.*

"Granulation of Hot Metal," by 360 Editor, Apr. 23, 2018, 4 pages.

(56) References Cited

OTHER PUBLICATIONS

Beskow et al., "Industrial and High-Capacity Production of Granulated Pig Iron," Association for Iron & Steel Technology, AISTech, May 6-9, 2019, pp. 485-493.
Beskow et al., "World's First High-capacity Granshot © Iron Granulation in Operation at SSAB Oxelosund," AISTech 2009 Proceedings—vol. I, pp. 211-218.
Dupon et al., "Granshot Iron Granulation for Optimized Plant Logistics," METEC InSteelCon Jun. 27-Jul. 1, 2011, Düsseldorf, Germany; 7 pages.
Granulated Pig Iron (GPI), International Iron Metallics Association, accessed Sep. 17, 2024 from https://www.metallics.org/gpi.html; 4 pages.
Industrial and High Capacity Granulation of Pig Iron, Data Sheet, Uvån Hagfors Teknologi AB, Jun. 2019, 4 pages.
Love et al., "Energy Recovery in Granshot ©—Process," KTH Industrial Engineering and Management, Stockholm, Sweden, Nov. 25, 2008, 70 pages.
Lundstrom et al., "Pig Iron Granulation at Iscor Saldanha Steel," AISTech 2004 Proceedings—vol. I, pp. 517-524.
Lundstrom, P. "Iron Granulation in Integrated Steel Plants," Nordic Steel & Mining Review 2006, pp. 16-17.
Polanco et al., "Granulation Methods for Metals and Ferroalloys," pp. 401-410. In: 72nd ABM Annual Congress, São Paulo, 2017.
Vesterberg et al., "Granulated metal product from direct tapped furnace—experience from operation at BEFESA Sweden," ATS-JSI Conference, Dec. 17-18, 2012, Paris, France, 2 pages.
International Iron Metallics Association (IIMA), "Use of Granulated Pig Iron (GPI) in the Electric Arc Furnace (EAF)," downloaded Nov. 30, 2024, dated 2018 (no month) (two pages) [wayback machine date of Feb. 9, 2022].
International Search Report and Written Opinion for International Application No. PCT/US2024/046275; Date of Mailing: Dec. 27, 2024; 11 pages.
Italimpianti Orafi, "Atomized metal powder: the revolution of the precious metals market," Online article, May 20, 2021; 2 pages.

* cited by examiner

USE OF A BASIC OXYGEN FURNACE TO PRODUCE GRANULATED METALLIC UNITS, AND ASSOCIATED SYSTEMS, DEVICES, AND METHODS

CROSS-REFERENCE TO RELATED APPLICATION(S)

The present application claims the benefit of U.S. Provisional Patent Application No. 63/581,946, filed Sep. 11, 2023, and titled "SYSTEM AND METHOD FOR CONTINUOUS GRANULATED PIG IRON (GPI) PRODUCTION," the disclosure of which is incorporated herein by reference in its entirety. The present application is related to the following applications, the disclosures of which are incorporated herein by reference in their entireties: U.S. patent application Ser. No. 18/882,116, filed Sep. 11, 2024, and titled "RAILCARS FOR TRANSPORTING GRANULATED METALLIC UNITS, AND ASSOCIATED SYSTEMS, DEVICES, AND METHODS"; U.S. patent application Ser. No. 18/882,045, filed Sep. 11, 2024, and titled "LOADING GRANULATED METALLIC UNITS INTO RAILCARS, AND ASSOCIATED SYSTEMS, DEVICES, AND METHODS"; U.S. patent application Ser. No. 18/882,191, filed Sep. 11, 2024, and titled "LOW-SULFUR GRANULATED METALLIC UNITS, AND ASSOCIATED SYSTEMS, DEVICES, AND METHODS"; U.S. patent application Ser. No. 18/882,638, filed Sep. 11, 2024, and titled "CONTINUOUS GRANULATED METALLIC UNITS PRODUCTION, AND ASSOCIATED SYSTEMS, DEVICES, AND METHODS"; U.S. patent application Ser. No. 18/882,256, filed Sep. 11, 2024, and titled "LOW-CARBON GRANULATED METALLIC UNITS, AND ASSOCIATED SYSTEMS, DEVICES, AND METHODS"; U.S. patent application Ser. No. 18/882,531, filed Sep. 11, 2024, and titled "TORPEDO CARS FOR USE WITH GRANULATED METALLIC UNIT PRODUCTION, AND ASSOCIATED SYSTEMS, DEVICES, AND METHODS"; U.S. patent application Ser. No. 18/882,384, filed Sep. 11, 2024, and titled "TREATING COOLING WATER IN IRON PRODUCTION FACILITIES, AND ASSOCIATED SYSTEMS, DEVICES, AND METHODS"; U.S. patent application Ser. No. 18/882,465, filed Sep. 11, 2024, and titled "USE OF RESIDUAL IRON WITHIN GRANULATED METALLIC UNIT PRODUCTION FACILITIES, AND ASSOCIATED SYSTEMS, DEVICES, AND METHODS"; U.S. patent application Ser. No. 18/882,501, filed Sep. 11, 2024, and titled "PROCESSING GRANULATED METALLIC UNITS WITHIN ELECTRIC ARC FURNACES, AND ASSOCIATED SYSTEMS AND METHODS".

TECHNICAL FIELD

The present technology generally relates to converting a basic oxygen furnace facility to produce granulated metallic units, and associated systems, devices, and methods.

BACKGROUND

Granulated pig iron (GPI) is a form of iron that is granulated into small, uniform particles, making it easier to handle, transport, and use in different metallurgical processes compared to conventional iron. The demand for GPI has been steadily increasing due to its versatile applications in various industries, including automotive, construction, and manufacturing. The growing popularity of GPI can be attributed to its high purity, consistent quality, and the efficiency it brings to the production of steel and other iron-based products.

Granulated pig iron is produced by rapidly cooling molten iron with water, resulting in the formation of granules. This process, known as granulation, is typically carried out after blast furnaces. However, current production methods are often characterized by intermittent production cycles due to various operational constraints, such as the need for periodic maintenance, fluctuations in raw material supply, and energy consumption issues. These interruptions not only affect the overall efficiency but also lead to increased production costs and variability in product quality. Therefore, there is a need for an improved production process that can ensure continuous and stable granulation of iron, thereby enhancing productivity and reducing operational costs.

BRIEF DESCRIPTION OF THE DRAWINGS

Features, aspects, and advantages of the presently disclosed technology may be better understood with regard to the following drawings.

Figure 1:
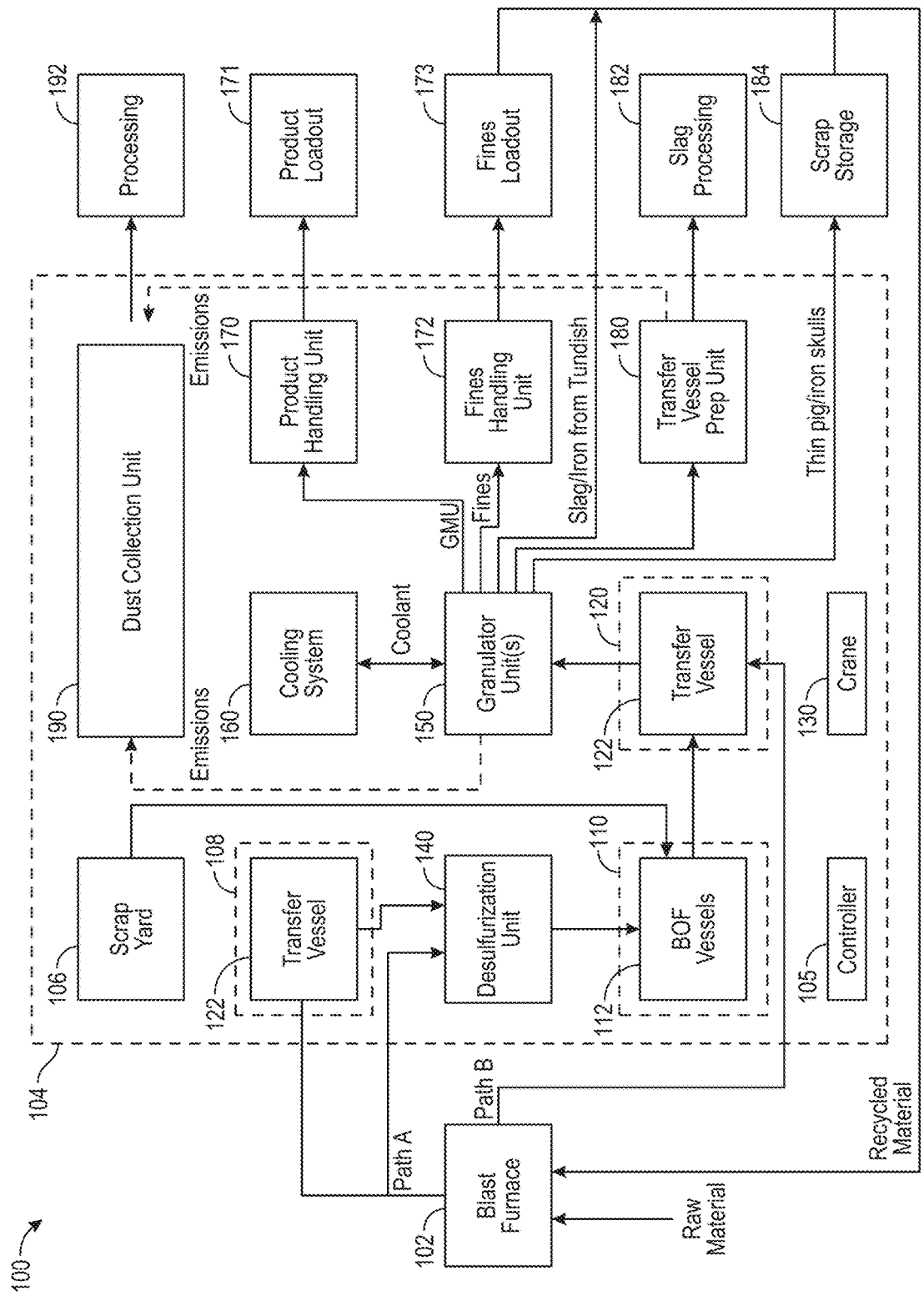
FIG. 1 is a schematic block diagram of a liquid hot metal processing system configured in accordance with embodiments of the present technology.

A person skilled in the relevant art will understand that the features shown in the drawings are for purposes of illustrations, and variations, including different and/or additional features and arrangements thereof, are possible.

DETAILED DESCRIPTION

I. Overview

The present technology is generally directed to systems, devices, and methods for converting or retrofitting a basic oxygen furnace (BOF) facility or a liquid hot metal processing unit to produce granulated metallic units (GMUs). GMUs can be produced by forming molten iron in a blast furnace and rapidly cooling the molten iron with water to form granules. However, producing GMUs can require numerous large and complex equipment such as flow control devices, overhead cranes, ladles, lances, etc. To build a new GMU production facility from scratch can be costly.

Embodiments of the present technology address at least some of the above described issues by converting or retrofitting a BOF facility to produce GMUs so that many of the existing equipment in the BOF facility can be repurposed. As described herein, some embodiments of the present technology can include a liquid hot metal processing system for producing granulated metallic units comprising a liquid hot metal processing unit including a ladle, a granulator unit, and an overhead crane. The ladle can be shaped to receive and store molten iron therein. The granulator unit can include a tilter positioned to receive and tilt the ladle, a controller operably coupled to the tilter to control tilting of the ladle, a tundish positioned to receive the molten iron from the ladle, and a reactor positioned to receive the molten iron from the tundish. The reactor can be configured to cool the molten iron to form GMUs. The overhead crane can be configured to transfer the ladle to and from the tilter.

Specific details of several embodiments of the technology are described below with reference to FIGS. 1-16. Other details describing well-known structures and systems often associated with furnaces, rails, conveyor belts, emission hoods, automated control systems, etc. have not been set forth in the following disclosure to avoid unnecessarily obscuring the description of the various embodiments of the technology. Many of the details, dimensions, angles, and other features shown in the Figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1-16.

II. Embodiments of a Liquid Hot Metal Processing System

FIG. 1 is a schematic block diagram of a liquid hot metal processing production system 100 ("the system 100") configured in accordance with embodiments of the present technology. As explained elsewhere herein, granulated metallic units (GMUs) can include granulated pig iron (GPI) or granulated steel (GS). Relatedly, molten metallics can include molten pig iron or molten steel. In some embodiments, the system 100 comprises a continuous system that can operate under continuous operations cycles, including in batch or semi-batch operations, for at least 2 hours, 4 hours, 6 hours, 8 hours, 10 hours, 12 hours, 16 hours, 20 hours, or 24 hours. The duration of the continuous operations cycles can depend at least in part on the size of the GMU to be produced by the system 100. In some embodiments, the system 100 can produce at least 2,000 tons, 4,000 tons, 6,000 tons, 8,000 tons, 10,000 tons, or more of GMUs per hour. In some embodiments, the system 100 is configured to primarily produce GMUs.

The system 100 can include a liquid hot metal processing unit 104 and a blast furnace 102 located outside of the liquid hot metal processing unit 104. The blast furnace 102 can receive input materials (e.g., iron ore, coke, limestone, and/or preheated air) and/or recycled material, which can be sourced from downstream components of the system 100 as described in further detail herein. Equations (1)-(6) below detail some of the chemical processes controlled at the blast furnace 102.

$$C + O_2 \rightarrow CO_2 \qquad (1)$$

$$CO_2 + C \rightarrow 2CO \qquad (2)$$

$$Fe_2O_3 + 3CO \rightarrow 2Fe + 3CO_2 \qquad (3)$$

$$Fe_2O_3 + 3C \rightarrow 2Fe + 3CO \qquad (4)$$

$$CaCO_3 \rightarrow CaO + CO_2 \qquad (5)$$

$$CaO + SiO_2 \rightarrow CaSiO_3 \qquad (6)$$

Equation (1) represents the combustion of coke, which is a form of carbon. When coke reacts with oxygen gas introduced into the furnace (e.g., via an oxygen lance), it forms carbon dioxide. This exothermic reaction releases a significant amount of heat, which is essential for maintaining the high temperatures required for subsequent reactions. The carbon dioxide produced via Equation (1) further reacts with additional coke to form carbon monoxide, as illustrated by Equation (2). This endothermic reaction helps to moderate the temperature within the blast furnace 102. Equations (3) and (4) represent the reduction of iron ore ($Fe_2O_3$). As illustrated by Equation (3), the iron oxide reacts with the carbon monoxide produced via Equation (2), which acts as a reducing agent to convert iron ore into iron and produces carbon dioxide as a byproduct. Alternatively, as illustrated by Equation (4), the iron ore may be reduced directly by the coke, albeit less commonly. Equations (5) and (6) represent the formation of slag. As illustrated by Equation (5), the calcium carbonate/limestone ($CaCO_3$) can decompose into calcium oxide and carbon dioxide at the high temperatures of the blast furnace 102. As illustrated by Equation (6), the calcium oxide can then react with silica ($SiO_2$), an impurity in the iron ore, to form calcium silicate ($CaSiO_3$), also known as slag. The blast furnace 102 can output molten metallics (from Equations (3) and (4)) and slag (from Equations (5) and (6)).

The liquid hot metal processing unit 104 can include a scrap yard 106, a charging aisle 108, a furnace aisle 110, and a teeming aisle 120. The charging aisle 108 can provide space for a transfer vessel 122 (e.g., a torpedo car, a ladle, etc.) holding molten metallics from the blast furnace 102. The furnace aisle 110 can include one or more BOF vessels 112. The scrap yard 106 can serve as a stockpile area for scraps that may be fed into the BOF vessels 112. The teeming aisle 120 can include additional transfer vessels 122 that can receive the output of the BOF vessels 112. Returning to the blast furnace 102, the transfer vessel 122 can transfer the molten metallics from the blast furnace 102 to the liquid hot metal processing unit 104 via either Path A or Path B.

Path A involves transporting the molten metallics to a desulfurization unit 140 in the liquid hot metal processing unit 104 directly or via the charging aisle 108 via the transfer vessel 122. The desulfurization unit 140 can include equipment to reduce a sulfur content of the molten metal. For example, one or more lances can be used to deliver magnesium (Mg), calcium carbide (CaC$_2$), or other sulfur-reducing agent to the molten metallics. In some embodiments, the molten metallics is desulfurized while remaining inside the transfer vessels 122. In some embodiments, the molten metallics is desulfurized in a torpedo car, and the desulfurized molten metallics is subsequently transferred to a ladle. Equations (7) and (8) below detail the reactions between the sulfur and the sulfur-reducing agents.

$$Mg + S \rightarrow MgS \quad (7)$$

$$CaC_2 + S \rightarrow CaS + 2C \quad (8)$$

The resulting substances, including magnesium sulfide (MgS) and calcium sulfide (CaS), are not soluble in molten metallics and will therefore be in solid form (e.g., as solid particles) that can be more readily removed at the desulfurization unit 140 and/or further downstream. As discussed further herein, reducing the sulfur content can increase the quality of the GMUs product and/or allow the production process to be continuous. Notably, conventional facilities may not include a desulfurization unit or may otherwise lack the ability to desulfurize molten metallics. One reason for this is that conventional steelmaking facilities directly feed molten metallics from blast furnaces to basic oxygen furnaces, and opt to granulate the molten metallics only when the basic oxygen furnaces are down. Because producing GMUs is a backup operation for such facilities, the added complexity and costs associated with establishing desulfurization equipment may not be economical.

After the desulfurization process, the desulfurized molten metallics can be fed to basic oxygen furnace (BOF) vessels 112 in the furnace aisle 110. The BOF vessels 112 can reheat and/or reduce a carbon content of the molten metal. For example, one or more oxygen lances can be used to deliver oxygen gas to the molten metallics in the BOF vessels 112. The oxygen can react with carbon present in the molten metallics, causing combustion that can reheat the molten metallics, which may have cooled down to below a desired temperature range, such as between, 2000-3000° F., between 2300-2500° F., between 2300-2400° F., or between 2340-2350° F., or the iron liquidus/carbon equilibrium/eutectic point. Additionally or alternatively, the desired temperature can be at least 100° F., 200° F., 300° F., or 400° F. above a solidification temperature, depending on a chemical makeup of the composition (e.g., a silicon content of the composition). The reaction between the oxygen and the carbon can also reduce the carbon content of the molten metal, which can be desirable for tuning material properties of the end product. For example, the resulting GMUs may have a sufficiently low carbon content to be more steel-like. The molten metallics can subsequently be transferred from the BOF vessels 112 to the transfer vessels 122 in the teeming aisle 120. On the other hand, Path B involves skipping the desulfurization unit 140 and the BOF vessels 112 and instead transferring the molten metallics from the blast furnace 102 directly to the transfer vessels 122 in the teeming aisle 120.

As shown in FIG. 1, the liquid hot metal processing unit 104 can further include an overhead crane 130, one or more granulator units 150, and a cooling system 160. The overhead crane 130 can be controlled (e.g., using a controller 105) to carry the transfer vessels 122 (e.g., ladles) with the molten metallics to downstream units in the liquid hot metal processing unit 104. In some embodiments, the overhead crane 130 carries the transfer vessels 122 to the one or more granulator units 150. The system 100 can include one, two, three, four, five, six, or more granulator units 150. Each granulator unit 150 can include a granulation reactor that receives and granulates molten metallics to form granulated products. For example, the granulation reactor can include a cavity that holds water and/or additives that help achieve a desired heat capacity and/or thermal conductivity, and the molten metallics can be transferred (e.g., poured, sprayed) onto a target of the reactor holding the water. The water can be maintained at a sufficiently low temperature by the cooling system 160 (e.g., cooled directly by pumping the water between the granulator units 150 and the cooling system 160, cooled indirectly by pumping a coolant separate from the water that receives the molten metallics). In some embodiments, each granulator unit 150 includes one or more components for controlling the flow of molten metallics from the transfer vessels 122 to the granulation reactor. As one of ordinary skill in the art will appreciate, flow control can affect the shape, size, and quality of the granulated products. The granulator units 150 can also include a dewatering assembly for drying the granulated products from the granulation reactor to output GMUs. The granulator units 150 can further include a classifier assembly for filtering the filtrate from the dewatering assembly to output fines.

The liquid hot metal processing unit 104 can further include a product handing unit 170 to receive the GMUs output by the granulator units 150 (e.g., by the dewatering assembly), and a fines handling unit 172 to receive the GMU fines output by the granulator units 150 (e.g., by the classifier assembly). In some embodiments, the product handling unit 170 and/or the fines handling unit 172 each includes one or more conveyor belts, diverters, stockpile locations, etc. The liquid hot metal processing unit 104 can further include a transfer vessel preparation unit 180 that can remove slag and/or kish from the transfer vessel 122. For example, after delivering the molten metallics to the granulator units 150, the overhead crane 130 can carry the transfer vessels 122 to the transfer vessel preparation unit 180 to be cleaned or otherwise prepared for the next cycle of transferring molten metallics.

The system 100 can additionally include a product loadout 171, a fines loadout 173, slag processing 182, and a scrap storage 184 outside the liquid hot metal processing unit 104. The product loadout 171 can be downstream of the product handling unit 170 to receive GMUs products. The fines loadout 173 can be downstream of the fines handling unit 172 to receive GMU fines. The slag processing 182 can be downstream of the transfer vessel preparation unit 180 to receive slag removed from the transfer vessels. The scrap storage 184 can be downstream of the granulator units 150 to receive thin pig and/or iron skulls. As shown in FIG. 1, the fines at the fines loadout 173, slag and/or iron from the tundish at the granulator units 150, and/or the thin pig and/or iron skulls at the scrap storage 184 can be fed back into the blast furnace 102 as recycled materials. In some embodiments, the recycled materials are processed (e.g., pelletized) prior to being fed into the blast furnace 102.

Furthermore, emissions from various components of the system 100 can be collected and directed towards one or more dust collection units 190 (e.g., one or more baghouses, one or more scrubbers, one or more precipitators, etc.) in the liquid hot metal processing unit 104. For example, emissions from the desulfurization unit 140, the granulator units 150, and the transfer vessel preparation unit 180 can be collected via fume hoods and directed to the dust collection unit 190 via pipes. The dust collection unit 190 can filter the emissions to remove dust therefrom so that clean waste gas is sent to stacks (not shown) to be released into the atmosphere, and the removed dust can be directed to further processing 192.

Figure 2:
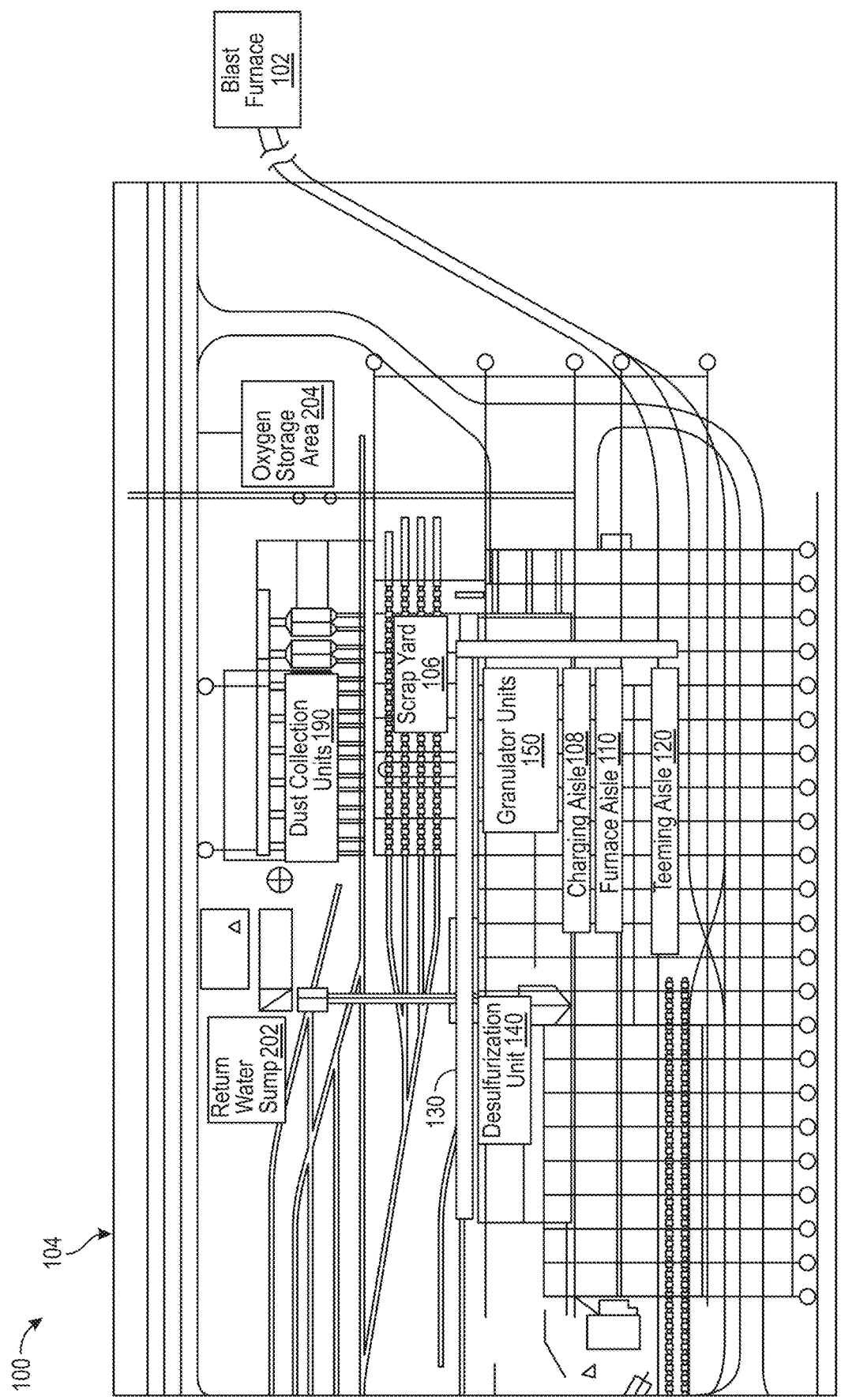
FIG. 2 is a plan view of the liquid hot metal processing system of FIG. 1, configured in accordance with embodiments of the present technology.

FIG. 2 is a plan view of the BOF GMU system 100, configured in accordance with embodiments of the present technology. As shown the blast furnace 102 can be removed from the liquid hot metal processing unit 104. The liquid hot metal processing unit 104 can include the charging aisle 108, the furnace aisle 110 adjacent to the charging aisle 108, and the teeming aisle 120 adjacent to the furnace aisle 110. The desulfurization unit 140 can be located away from the charging aisle 108, and the granulator units 150 can be located adjacent to the charging aisle 108. In the illustrated embodiment, the overhead crane 130 can travel along an L-shaped path extending next to the charging aisle 108, the furnace aisle 110, the teeming aisle 120, and desulfurization unit 140, and the granulator units 150. Therefore, the overhead crane 130 can carry the transfer vessels 122 from the teeming aisle 120 to the desulfurization unit 140 and/or the granulator units 150. Furthermore, the liquid hot metal processing unit 104 can include the scrap yard 106, the one or more dust collection units 190, a return water sump 202, and an oxygen storage area 204. The return water sump 202 can receive water collected from, e.g., the classifier included in the granulator units 150. The oxygen storage area 204 can store oxygen for, e.g., the oxygen lances used at the BOF vessels 112.

Referring to FIGS. 1 and 2 together, converting a BOF facility or liquid hot metal processing unit to produce GMUs as opposed to, e.g., building a new GMU production facility can significant costs because many of the required equipment may be present at the BOF facility. Such existing equipment can include the overhead crane 130, the desulfurization unit 140, the transfer vessels 122, and select components included in the granulator units 150, as discussed in further detail herein. Accordingly, embodiments of the present technology are expected to enable the production of GMUs at a fraction of the cost compared to building a new production facility and initiate production much earlier due to time savings associated with constructing a new production facility.

Also, the system 100 is expected to be able to continuously produce GMU, unlike conventional GMU production systems. First, the inclusion of the desulfurization unit 140 provides several advantages. For example, GMUs with lower sulfur content produces less slag when melted at an electric arc furnace downstream, saving associated time, costs, and energy consumption. For example, a relatively lower level of sulfur and/or carbon content can improve throughput and increase production of the downstream electric arc furnace (EAF) and/or ladle metallurgical furnace (LMF). The use of GMUs with lower sulfur content can also ease maintaining the desired chemical composition and temperature, reducing the frequency of adjustments and interruptions during the melting cycle. Lower sulfur levels can also result in less wear and tear on other components of the system, reducing maintenance needs and associated downtime.

Second, the inclusion of a plurality of granulator units 150 allows molten metallics to be granulated at separate granulator units in parallel. The granulator units 150 can also serve as backups for one another in case one of the granulator units 150 is down (e.g., due to malfunctioning components, maintenance, etc.) or in a turndown situation. Furthermore, in some embodiments, the various components of the granulator units 150 are modular. For example, each of the components can be easily and independently removed (e.g., for maintenance) and/or replaced (e.g., via an overhead crane) without impacting operation of the other components.

As discussed above, the system 100 is designed for continuous operation. Relative to non-continuous GPI production systems, embodiments of the present technology enhance energy efficiency and reduces emissions by minimizing the need for frequent shutdowns and restarts, which are often associated with excessive venting and/or less efficient operations. As described herein, some embodiments include (i) a desulfurization unit that lowers the sulfur content in molten metal, thereby reducing sulfur dioxide ($SO_2$) emissions, (ii) dust collection units that filter out particulate matter, thereby reducing air pollution, (iii) infrastructure to recycle fines, slag, iron skulls and other residual and/or previously-processed metallics, thereby reducing the environmental impact associated with raw material extraction and conserving natural resources, and/or (iv) water management and cooling systems that minimize heat losses, enhance thermal efficiency of production processes, and optimize water consumption. Overall, the continuous GMU production system 100 enhances productivity while minimizing greenhouse gas emissions and waste, contributing to more sustainable industrial practices and helping mitigate climate change.

Relatedly, conventional iron production has a significant environmental impact due to its high energy consumption and emissions of pollutants. As such, embodiments of the present technology which relate to GMU production systems can reduce this impact. Sulfur, phosphorus, and silicon in GPI negatively affect the quality and properties of final metal products, leading to issues like reduced ductility, toughness, and weldability, as well as surface defects and brittleness. These impurities also contribute to the formation of non-metallic inclusions and excessive slag, complicating metal processing and compromising product quality. Sulfur, in particular, accelerates the wear and erosion of metal processing equipment, increasing maintenance costs and decreasing equipment lifespan. Embodiments of the present technology include methods for removing these impurities in part can improve the quality and durability of final metal products and enhances the efficiency and lifespan of processing equipment, leading to cost savings and more sustainable production practices.

Figure 3:
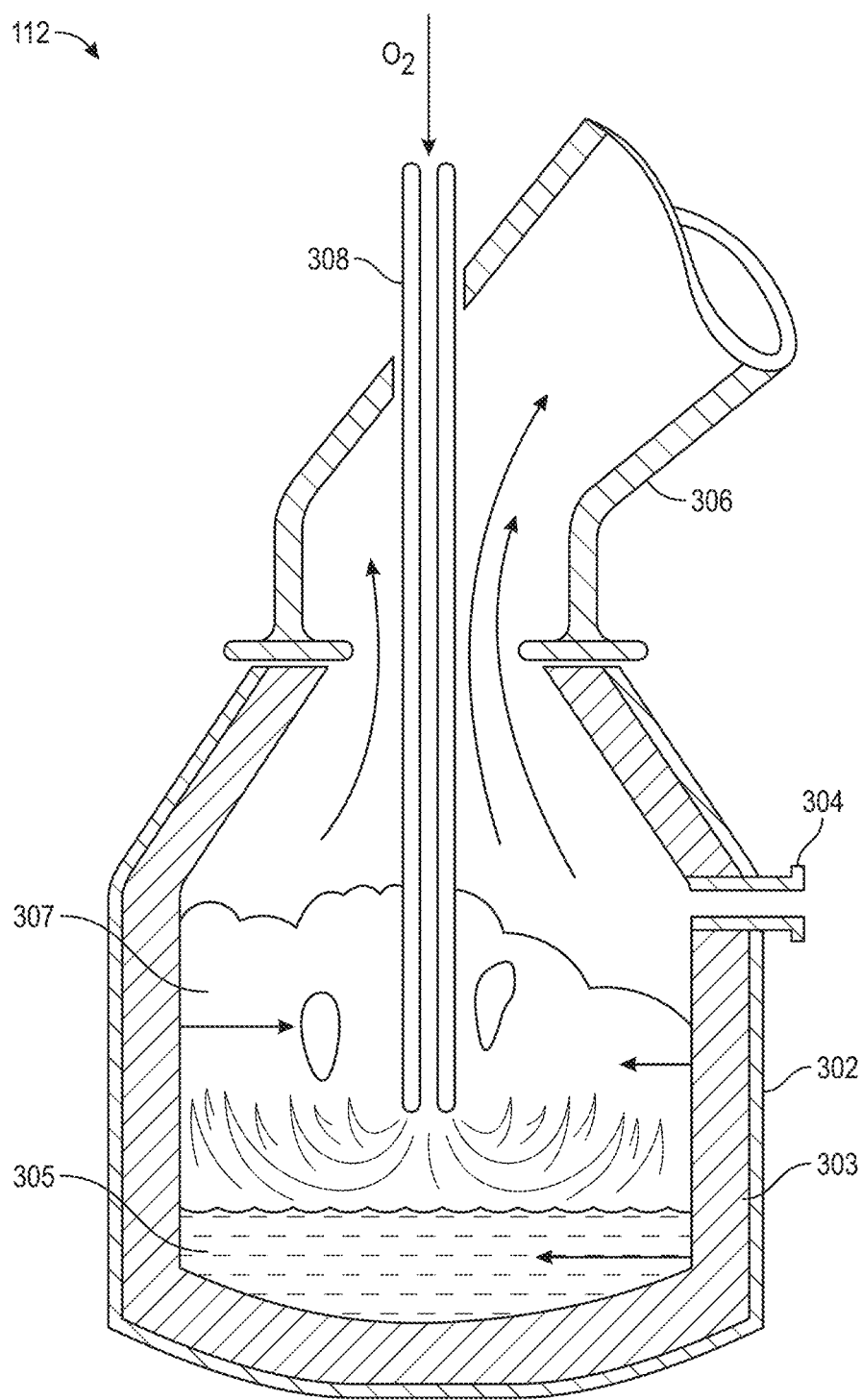
FIG. 3 is a partially schematic, side cross-sectional view of a basic oxygen furnace vessel configured in accordance with embodiments of the present technology.

FIG. 3 is a partially schematic, side cross-sectional view of the BOF vessel 112 configured in accordance with embodiments of the present technology. As discussed above with reference to FIG. 1, the BOF vessel 112 can be used if Path A is taken. The BOF vessel 112 can include a shell 302 (e.g., a steel shell) defining an interior chamber for receiving materials and a liner material 303 (e.g., a refractory liner) along the inner surface of the shell 302. The shell 302 can include a tap hole 304 through which materials can be output by the BOF vessel 112, and a fume collection hood or pipe 306 extending from the top portion of the shell 302. As shown, one or more oxygen lances 308 can be inserted into the interior chamber of the BOF vessel 112.

In operation, the BOF vessel 112 can receive molten metallics 305 from, e.g., a transfer vessel such as a torpedo car coming from the blast furnace 102. In some embodiments, molten slag 307 can be present on the surface of the molten metallics 305. The oxygen lances 308 can be operated to deliver oxygen gas (e.g., from the oxygen storage area 204) to the molten metallics 305 and the molten slag 307. The oxygen gas can combust carbon remaining in the materials (e.g., leftover coke), thereby simultaneously heating the molten metallics 305 and reducing a carbon content thereof. The molten metallics 305 may have cooled while transported from the blast furnace 102 to the BOF vessel 112, and the temperature of the molten metallics 305 can be raised to be within a desired temperature range that, e.g., avoids premature solidification of the molten metallics 305. As one of ordinary skill in the art will appreciate, maintaining the molten metallics 305 in a fluid state can facilitate proper granulation downstream of the BOF vessel 112. Emissions generated in the BOF vessel 112 can be directed to the dust collection unit 190 or other emissions unit via the fume collection hood or pipe 306.

Figure 4:
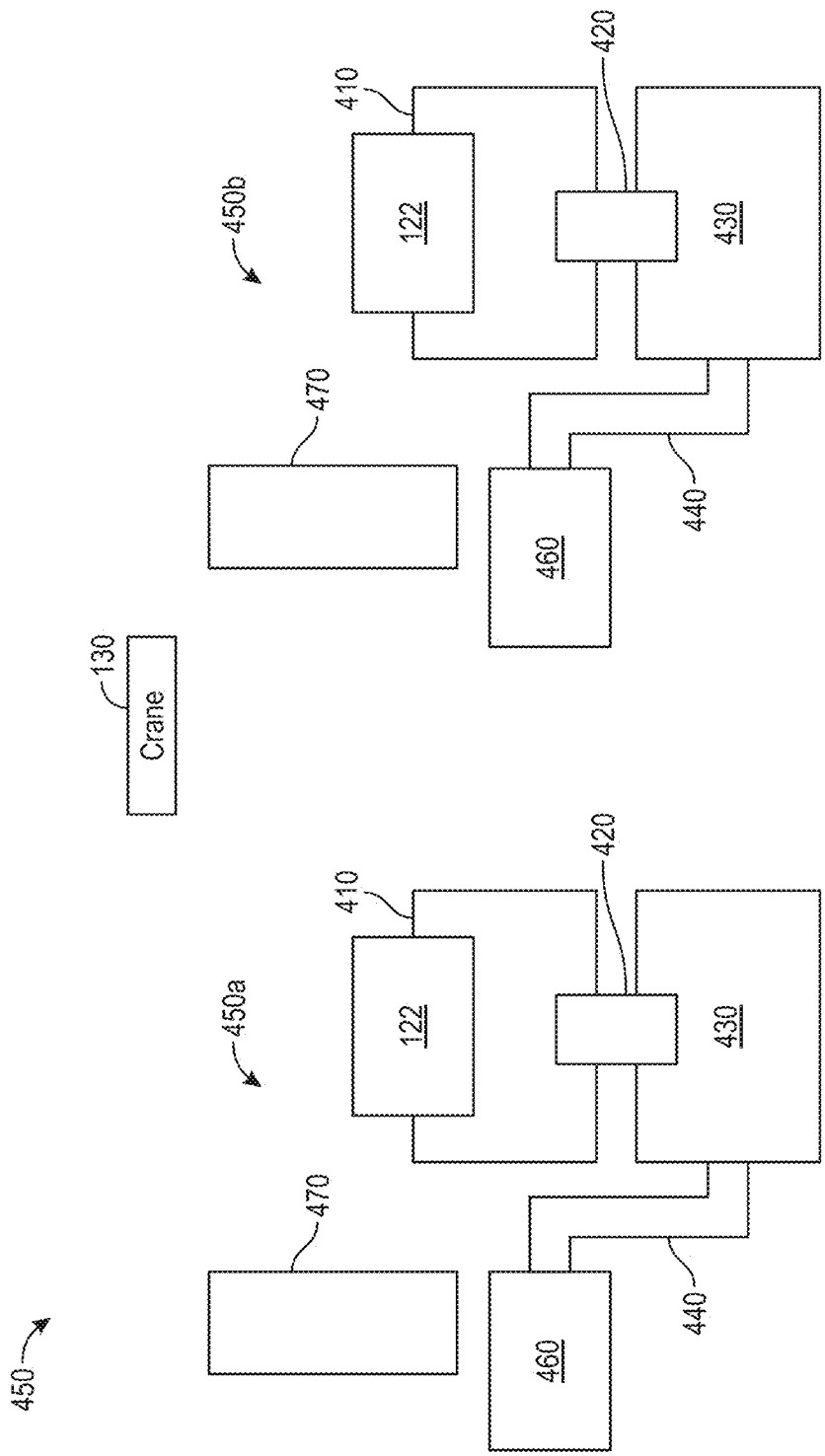
FIG. 4 is a schematic plan view of two granulator units in a first arrangement and configured in accordance with embodiments of the present technology.

FIG. 4 is a schematic plan view of two granulator units 450 in a first arrangement and configured in accordance with embodiments of the present technology. In the illustrated embodiment, a first granulator unit 450a and a second granulator unit 450b are positioned side-by-side. In the first arrangement, the first granulator unit 450a and the second granulator unit 450b can have their components arranged in an identical or generally similar layout. Each granulator unit 450 can include a tilter 410, a tundish 420, a granulation reactor 430, an ejector 440, a dewatering assembly 460, and a classifier assembly 470. The tilter 410 can be sized and positioned to receive one transfer vessel 122 (e.g., a ladle carried by the overhead crane 130). The tundish 420 can be positioned to receive molten metallics from the transfer vessel 122 and supported directly above the granulation reactor 430. The dewatering assembly 460 can be positioned next to the tilter 410 and the granulation reactor 430. The ejector 440 can extend between the granulation reactor 430 and the dewatering assembly 460. The classifier assembly 470 can be positioned next to the dewatering assembly 460.

Notably, many of the components of the granulator units 450, such as the dewatering assembly 460 and the classifier assembly 470, are positioned side-by-side as opposed to, e.g., on top of one another. This allows the overhead crane 130 to more easily access each of the components, allowing the components to be lifted and removed for maintenance and/or replacement. As discussed further herein, each of the components can include lift lugs that the overhead crane 130 can hook onto for lifting and moving. This layout can be in contrast to conventional facilities in which components are positioned over one another and thus difficult to quickly lift and remove using a crane.

Figure 5:
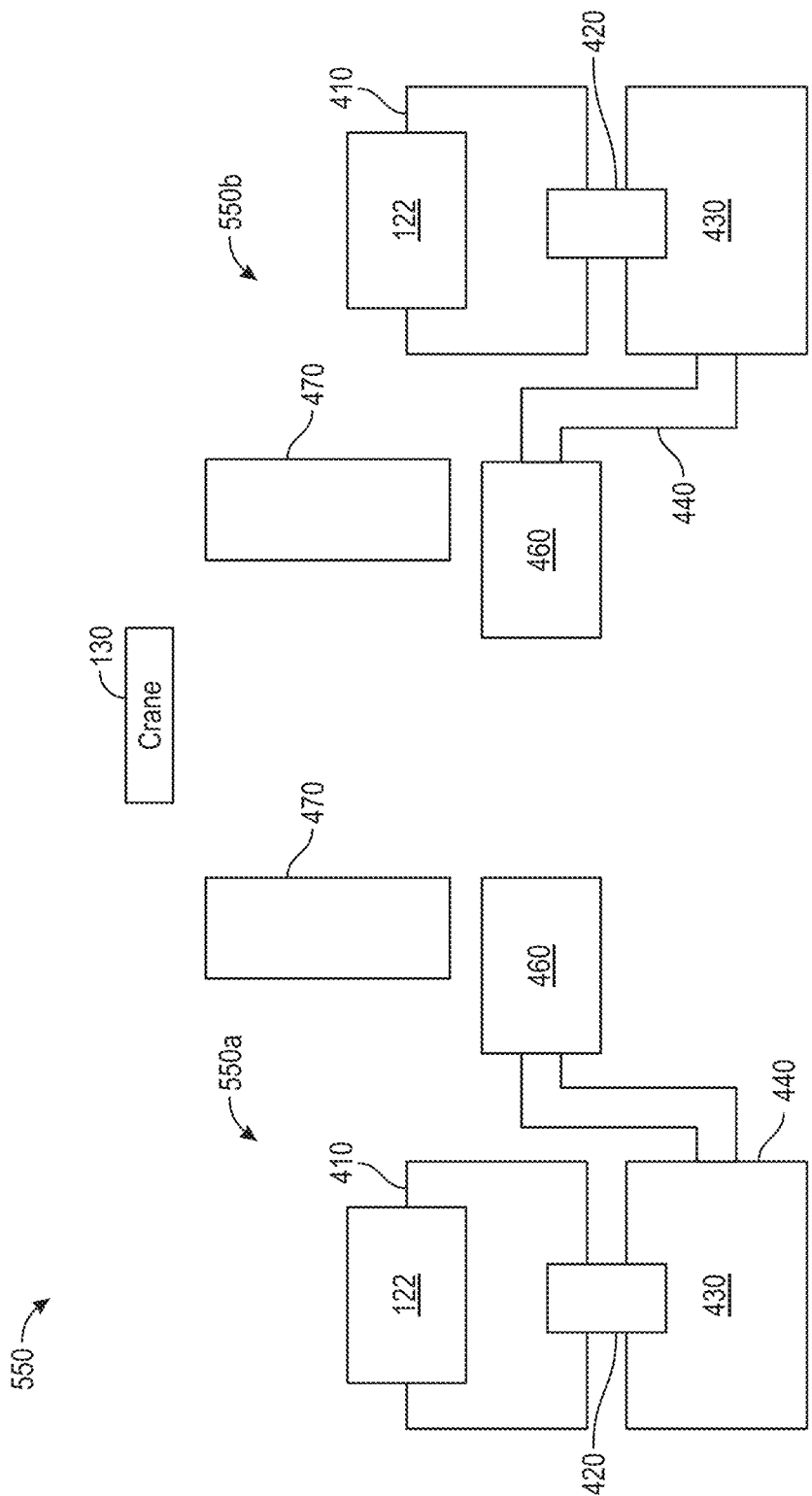
FIG. 5 is a schematic plan view of two granulator units in a second arrangement and configured in accordance with embodiments of the present technology.

FIG. 5 is a schematic plan view of two granulator units 550 in a second arrangement and configured in accordance with embodiments of the present technology. In the illustrated embodiment, a first granulator unit 550a and a second granulator unit 550b are positioned side-by-side. Unlike in the first arrangement illustrated in FIG. 4, in the second arrangement, the components of the first granulator unit 550a and the components of the second granulator unit 550b are not arranged in an identical or generally similar layout. Instead, in a generally mirrored arrangement, the tilters 410, the tundishes 420, and the granulation reactors 430 of the two granulator units 550 are positioned towards opposite ends and away from the same components of the other granulator unit 550. The dewatering assemblies 460 and the classifier assemblies 470 are positioned between the tilters 410, the tundishes 420, and the granulation reactors 430 of the two granulator units 550. Compared to the first arrangement of FIG. 4, in the second arrangement of FIG. 5, the two transfer vessels 122 can be positioned farther apart from one another, and the dewatering assemblies 460 can be positioned closer to one another and face each other so that, e.g., the GMUs products can be collected using a single container or conveyor.

Referring to FIGS. 4 and 5 together, it will be appreciated that the illustrated embodiments merely show example arrangements or layouts of granulator units, and that the components thereof can be arranged differently. Moreover, in some embodiments, the system 100 may include only one granulator unit or three, four, five, six, or more granulator units.

Figure 6A:
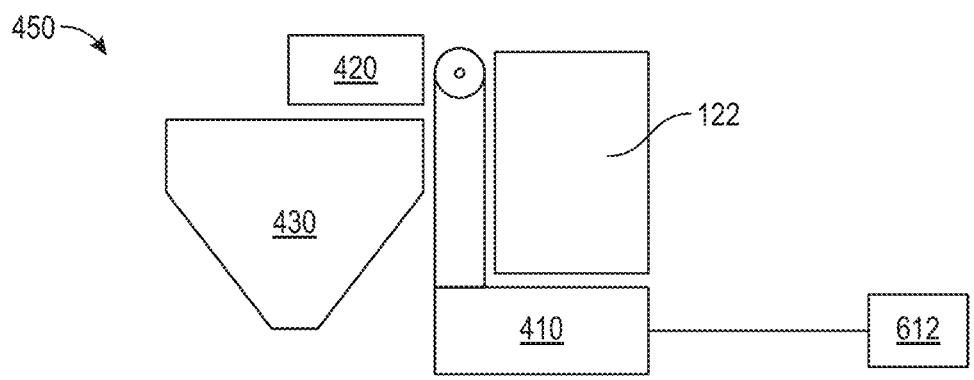
FIGS. 6A-6C are partially schematic side views illustrating tilting of a transfer vessel in accordance with embodiments of the present technology.
Figure 6B:
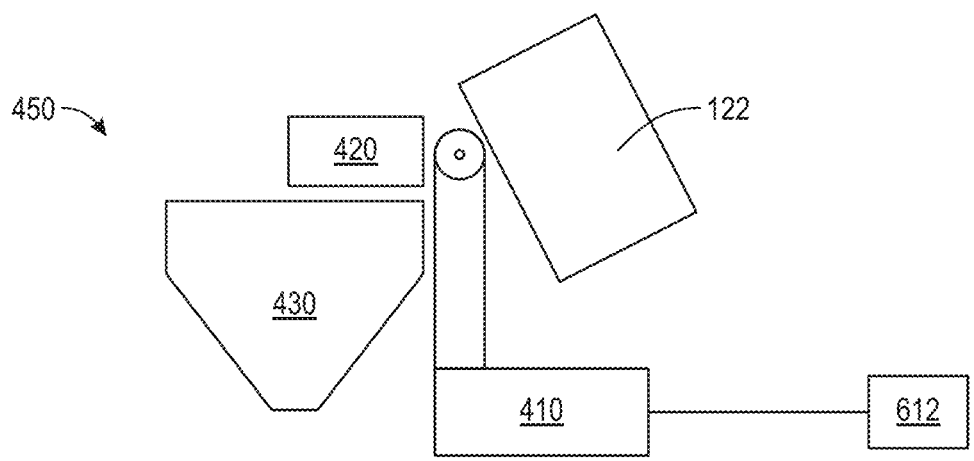
Figure 6C:
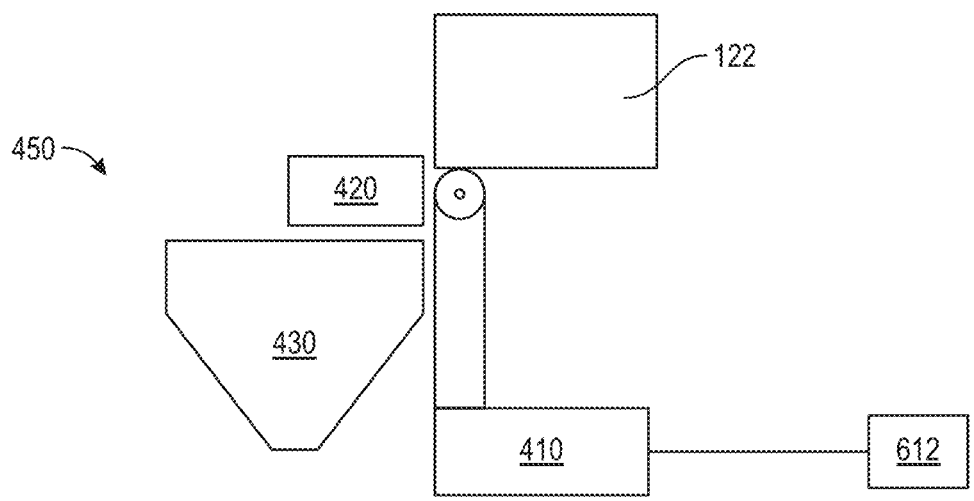

FIGS. 6A-6C are partially schematic side views illustrating tilting of the transfer vessel 122 in accordance with embodiments of the present technology. It is appreciated that FIGS. 6A-6C can represent tilting of the transfer vessel 122 in either the first arrangement of FIG. 4 or the second arrangement of FIG. 5. Referring first to FIG. 6A, the overhead crane 130 (not shown) can carry and place the transfer vessel 122 with molten metallics therein on the tilter 410. A controller 612 can be operably coupled to the tilter 410 for controlling the tilting of the transfer vessel 122. In some embodiments, operators and other personnel are at the left side of the granulator reactor 430 so that the overhead crane 130 does not cross paths with the personnel for safety reasons.

Referring next to FIGS. 6B and 6C together, the tilter 410 can include a linear actuator 614 or other motorized component that can lift and tilt the transfer vessel 122. Tilting the transfer vessel 122 allows the molten metallics therein to be transferred (e.g., poured) into the tundish 420. The controller 612 can operate the linear actuator 614 to tilt the transfer vessel 122 in a controlled manner such that, for example, the molten metallics flows out of the transfer vessel 122 and into the tundish 420 at a desired flow rate without overflowing the tundish or splashing too much molten metallics, which can result in material loss. As seen in FIG. 6C, the tilter 410 can tilt the transfer vessel 122 by an angle greater than 90 degrees.

Figure 7:
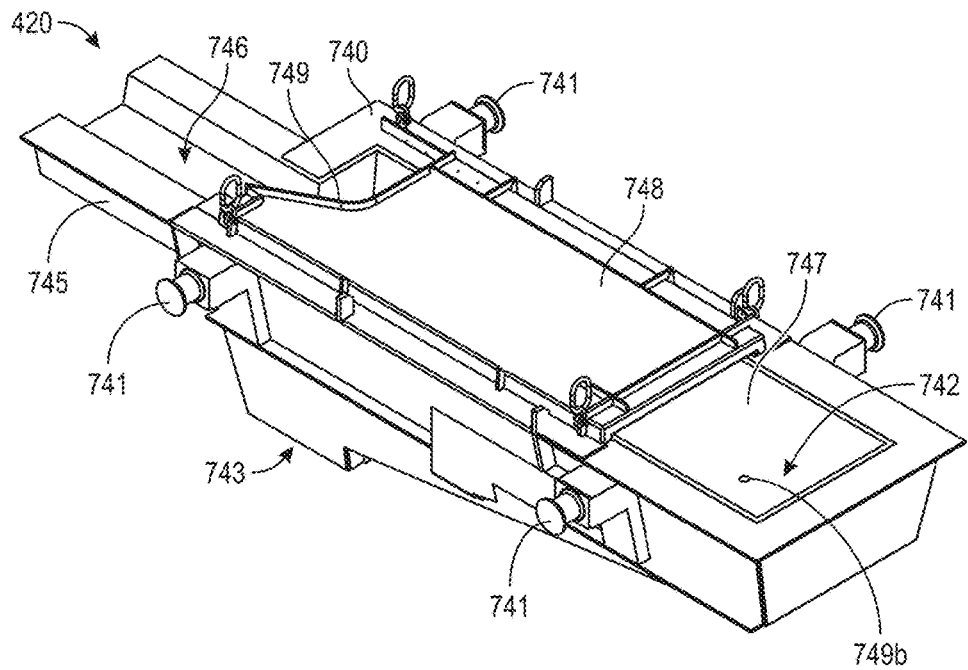
FIGS. 7, 8A, and 8B are front perspective, rear perspective, and side cross-sectional views, respectively, of a tundish configured in accordance with embodiments of the present technology.
Figure 8A:
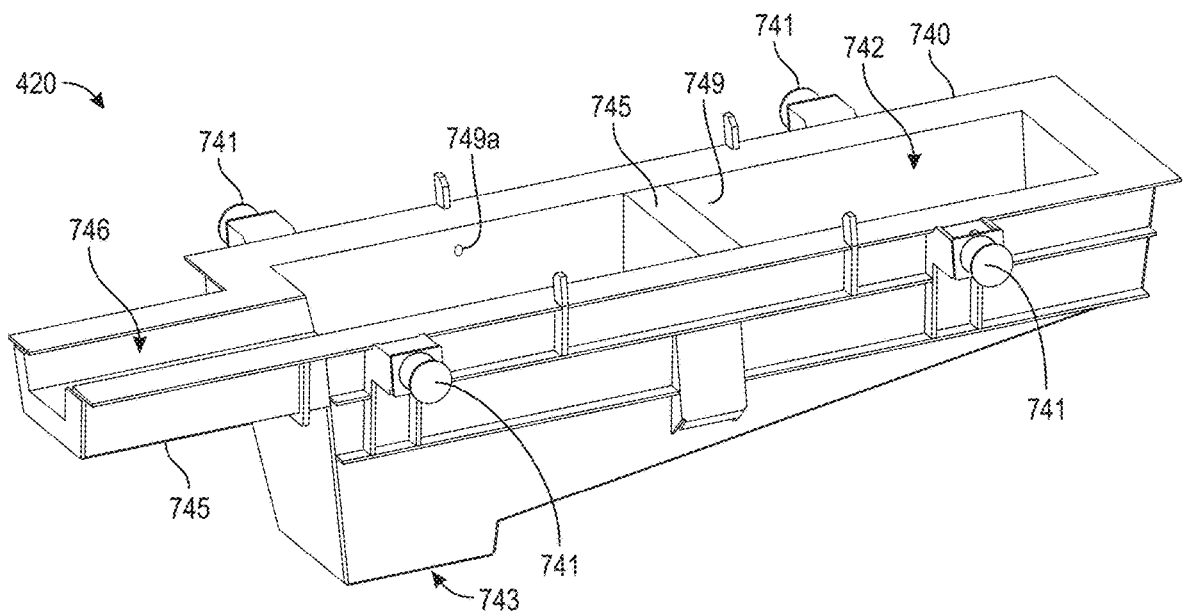
Figure 8B:
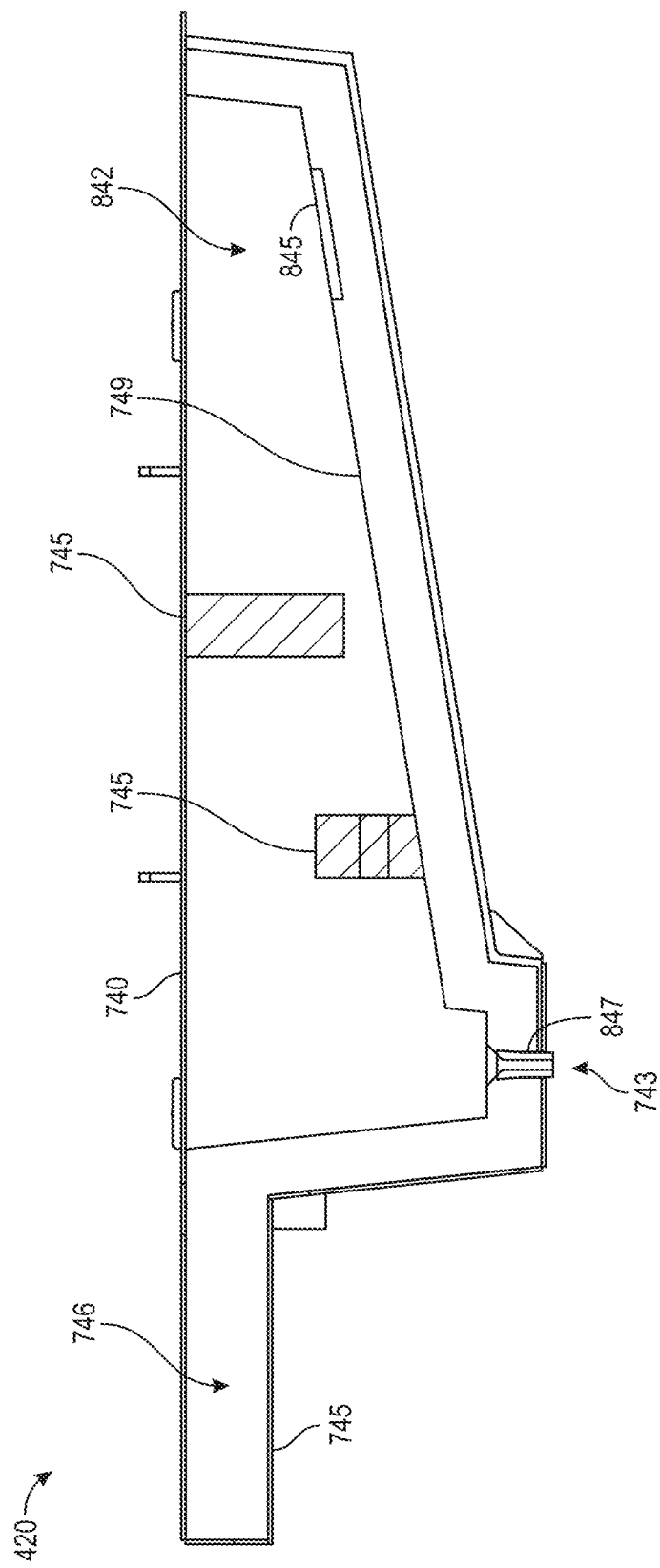

FIGS. 7, 8A, and 8B are front perspective, rear perspective, and side cross-sectional views, respectively, of the tundish 420 configured in accordance with embodiments of the present technology. The tundish 420 can include a tundish body 740, a cover 748 disposed at least partially over the tundish body 740, and an overflow channel 745 removably coupled to a front portion of the tundish body 740. The tundish body 740 can define a cavity that can receive and pool molten metallics therein. More specifically, the cavity can have an open top 742 near the rear of the tundish body 740 that is not covered by the cover 748 and receives the stream of molten metallics from the transfer vessel 122, and an outlet 743 at the lowest portion of and near a front end of the tundish body 740. As best seen in FIG. 8B, the tundish body 740 can have an angled bottom surface such that the molten metallics flows down toward the outlet 743. In some embodiments, the tundish 420 further includes a nozzle 847 at the outlet 743 to ensure that the molten metallics flows out of the outlet 743 in a controlled manner. The nozzle 847 can comprise silica carbide, graphite, non-wetting materials, and/or other suitable material. In some embodiments, the nozzle 847 can be vibrating. The inner surface of the tundish body 740 defining the cavity can be lined with a liner material 747 such as refractory lining, silicas, aluminas, material not containing magnesium, and/or other suitable lining. For example, the lining material 1347 can be the same or a similar material as the sacrificial refractory lining included in the blast furnace 102. A portion of the bottom surface of the tundish body 740 directly below the open top 742 can be covered with an impact pad 849 (FIG. 8B) that can absorb the impact of the stream of molten metallics transferred (e.g., poured) from the transfer vessel 122.

In some embodiments, the tundish 420 additionally includes one or more flow control devices 845 (e.g., a ferrostatic head flow control device) coupled to sidewalls of the tundish body 740 and extending at least partially into the cavity (e.g., downward, upward, sideways). The flow control devices 845 can be a static structure or an adjustable structure whose position and/or orientation relative to the tundish body 740 can be controlled. In some embodiments, the flow control device 845 comprises a solid plate. In some embodiments, the flow control device 845 comprises a plate with one or more holes extending therethrough at one or more angles and/or arranged in an array. In some embodiments, the tundish 420 further includes a level sensor 749a mounted on a sidewall of the tundish body 740 and/or one or more load sensors 749b mounted on the bottom surface of the tundish body 740. Furthermore, the tundish 420 can include a plurality of trunnions or lifting lugs 741 coupled to and extending outward from the sidewalls of the tundish body 740.

The cover 748, shown in FIG. 7 but omitted in FIGS. 8A and 8B to avoid obscuring certain details of the tundish 420, can be positioned to prevent molten metallics from splashing and spilling out of the tundish 420, which can otherwise lead to significant material loss. As shown in FIG. 7, the cover 748 can be shaped and sized to leave the open top 742 near the rear end of the tundish 420 exposed for receiving the stream of molten metallics from the transfer vessel 122. The cover 748 can include refractory lining (illustrated with patterning in FIG. 7) to also prevent other materials (e.g., splashed molten metallics or slag from the transfer vessel 122) from entering the tundish 420 outside of the open top 742. Towards the front end of the tundish 420, the cover 748 can have a curved edge 749, exposing a portion of the cavity directly above the outlet 743. In some embodiments, a stopper rod assembly (illustrated in and described in further detail below with reference to FIGS. 9 and 10) can be coupled to the front portion of the tundish 420 such that the stopper rod assembly can extend into the portion of the cavity exposed by the curved edge 749 and reach the outlet 743. It will be appreciated that the cover 748 can have other shapes and/or sizes to provide spilling prevention while allowing the stopper rod assembly access to the outlet 743.

The overflow channel 745 can define an overflow outlet 746 through which excess material can flow out of the tundish 420. As best seen in FIG. 8B, the overflow outlet 746 can be positioned higher than the outlet 743 so that the molten metallics primarily flows out of the tundish 420 via the outlet 743. The overflow channel 745 can be removably coupled to the tundish body 740 via, e.g., bolts and/or other fasteners. Advantageously, when the tundish 420 is transported to a cleaning/repair area, the overflow channel 745 can be detached from the tundish body 740 to facilitate handling. For example, the cleaning/repair area may include a machine that can flip the tundish 420 upside down, and detaching the overflow channel 745 can make it easier to place the tundish 420 on the machine.

In operation, the open top 742 of the tundish 420 receives the stream of molten metallics flowing out of the transfer vessel 122. The cover 748 can help ensure that only the stream of molten metallics enters the tundish 420 and can prevent splashes from spilling over the sides of the tundish body 740. After the stream of molten metallics hits the impact pad 849, the molten metallics can flow downward toward the outlet 743 and eventually pool in the cavity. The level sensor 749a can measure the surface level of the molten metallics and the load sensors 749b can measure the weight of the molten metallics in the cavity. In some embodiments, the readings from the level sensor 749a and/or the load sensors 749b are transmitted to the controller 612 (FIGS. 6A-6C) so that the tilt angle of the transfer vessel 122 can be controlled to achieve a desired flow rate at any given time. For example, if the level sensor 749a and/or the load sensors 749b indicate that there is too much molten metallics, the controller 612 can reduce the tilt angle until, e.g., the level sensor 749a and/or the load sensors 749b indicate that a sufficient amount of molten metallics has flowed out through the outlet 743 and/or the overflow outlet 746 and the transfer vessel 122 can be tilted more.

The flow control devices 845 can serve multiple functions. First, the flow control device 845 can contain agitation of the molten metallics at the rear side of the tundish 420. As molten metallics is transferred (e.g., poured) from the transfer vessel 122, the stream can cause splashing, waves, and other forms of turbulent flow at around the open top 742. The flow control device 845 can act as a barrier that blocks the agitation from crossing over towards the outlet 743. In some embodiments, the flow control device 845 is controllable to adjust a height thereof. As a result, the flow of molten metallics exiting the tundish 420 via the outlet 743 can be relatively calm and/or laminar. Second, the flow control device 845 can act as a barrier that blocks slag or other impurities floating on or near the surface of the molten metallics from crossing over towards the outlet 743. The slag that builds up at the open top 742 can be skimmed off the surface or eventually directed out of the tundish 420 via the overflow outlet 746. As a result, the flow of molten metallics exiting the tundish 420 via the outlet 743 can be relatively devoid of slag. Third, the flow control device 845 can act as a vortex breaker that can prevent or at least impede the formation of vortices in the molten metallics. It is appreciated that the tundish 420 can include a plurality of the flow control devices 845, and different ones of the flow control devices 845 can have different shapes and/or dimensions, and/or extend in different directions to provide the various functions described herein.

In the illustrated embodiment, the tundish 420 includes a total of four lifting lugs 741, as best seen in FIGS. 7 and 8A. The overhead crane 130 (FIG. 1) can be operated to lift, lower, and/or transport the tundish 420 using the lifting lugs 741. For example, the overhead crane 130 can be used to reposition the tundish 420 at a lower or higher height to increase or decrease the distance between the tundish 420 and other components of the granulator unit 150. In another example, the overhead crane 130 can be used to remove the tundish 420 from the granulator unit 150 for, e.g., maintenance. Because the system 100 is a continuous system and there may not be a conventional "downtime" during which components may undergo maintenance on-site, the ability to quickly and easily transport the tundish 420 for maintenance or replacement can be important to ensure that the system 100 remains continuous.

Figure 9:
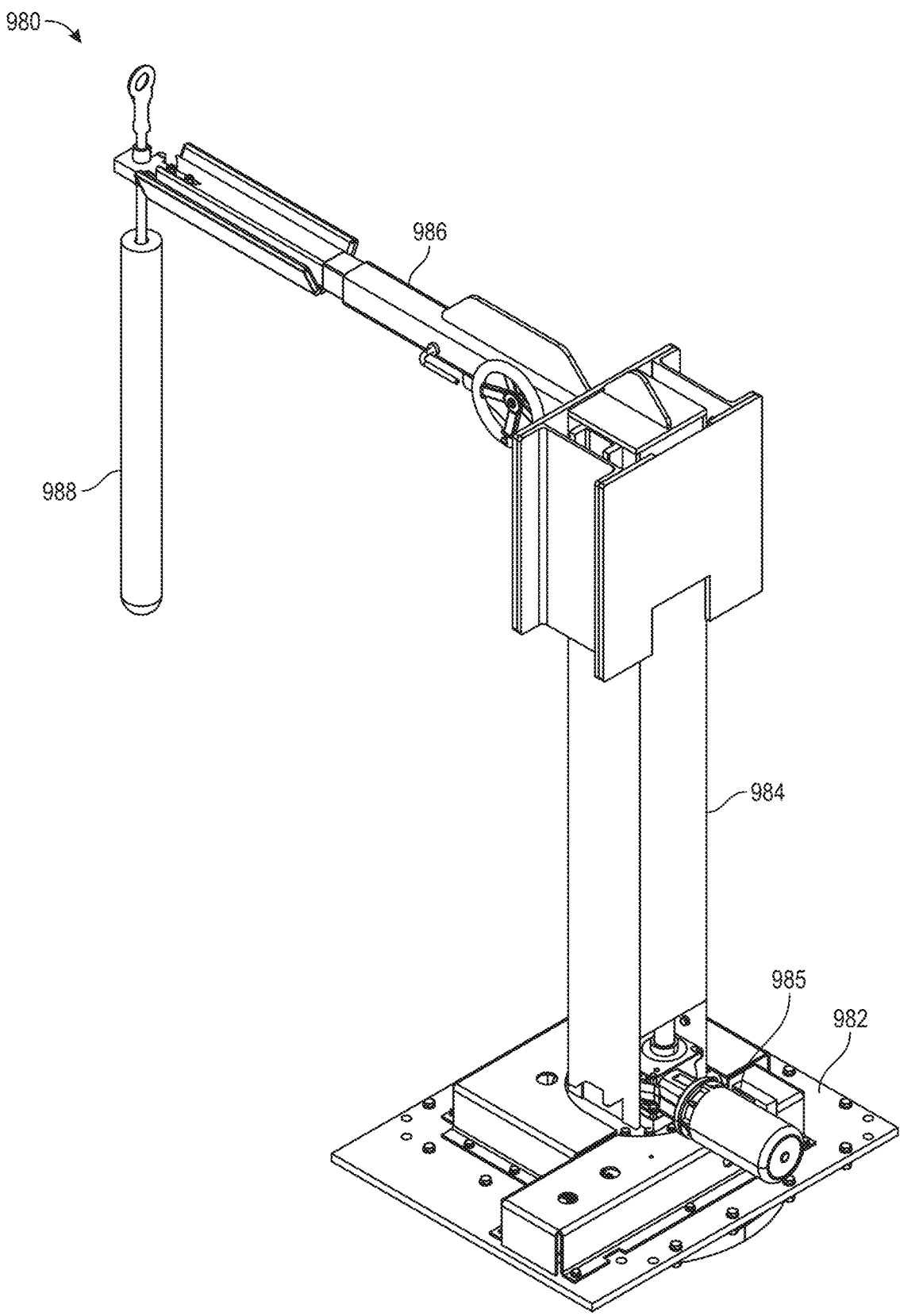
FIG. 9 is a perspective view of a stopper rod assembly configured in accordance with embodiments of the present technology.

FIG. 9 is a perspective view of a stopper rod assembly 980 configured in accordance with embodiments of the present technology. The stopper rod assembly 980 can include a base plate 982, a vertical member 984 extending vertically from the base plate 982, a horizontal member 986 extending horizontally from the vertical member 984, a motor 985 operably coupled to the vertical member 984 and/or the horizontal member 986, and a stopper rod 988 extending downward from a distal tip of the horizontal member 986. The base plate 982 can be coupled to the tundish 420, e.g., bolted to the tundish body 740. The stopper rod 988 can be shaped and sized to fit in the outlet 743 and/or the nozzle 847 of the tundish 420. In some embodiments, the stopper rod 988 includes refractory lining or other suitable lining to protect the stopper rod 988 from the hot molten metallics. In operation, a controller (not shown) can be used to operate the motor 985 to move the horizontal member 986, and thus the stopper rod 988, vertically along the length of the vertical member 984. Therefore, the stopper rod 988 can be remotely controlled to selectively plug the outlet 743 of the tundish 420 and thereby control the flow of molten metallics out of the tundish 420.

Figure 10:
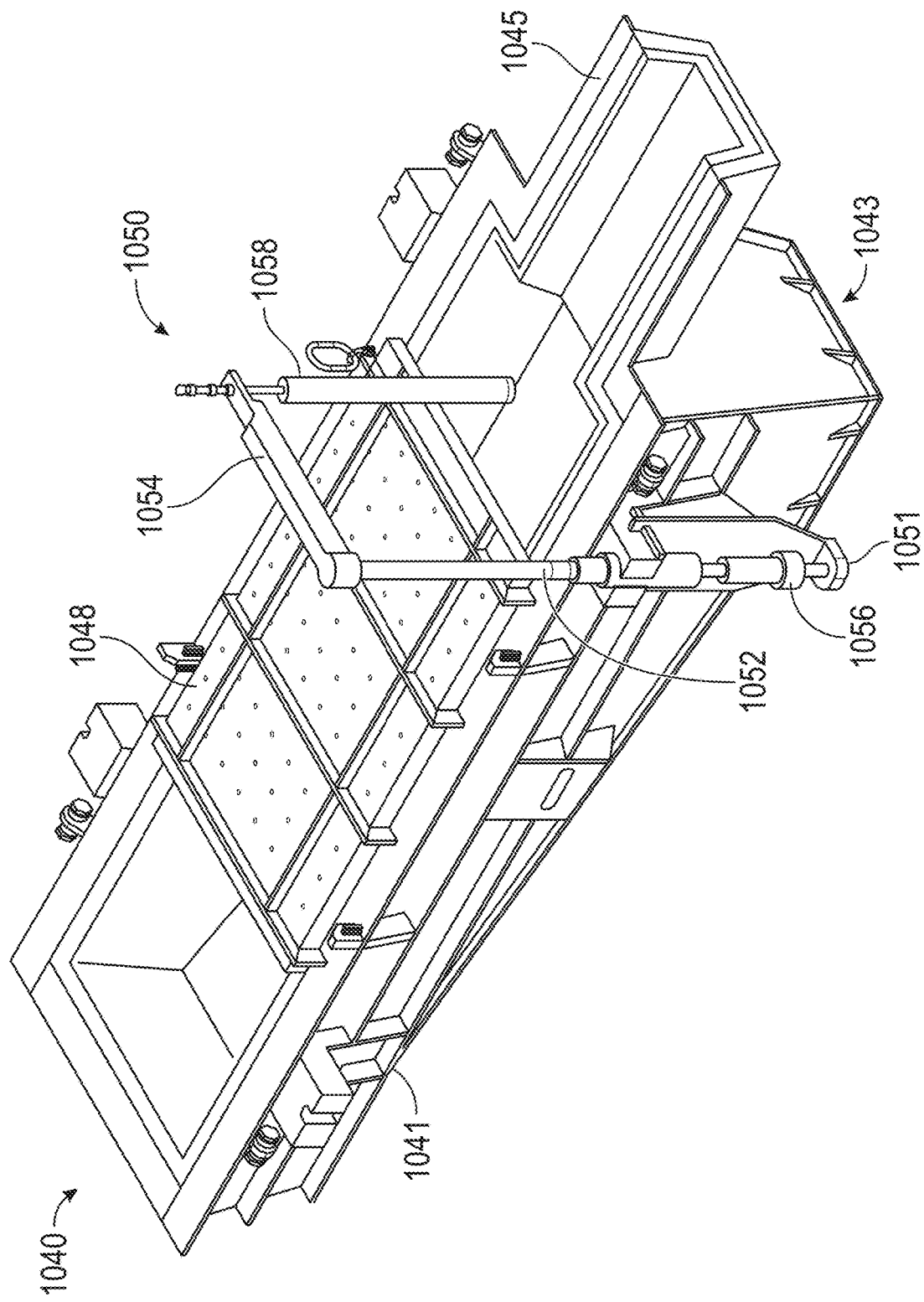
FIG. 10 is a perspective view of a tundish and a stopper rod assembly assembled together and configured in accordance with embodiments of the present technology.

FIG. 10 is a perspective view of a tundish 1040 and a stopper rod assembly 1050 assembled together and configured in accordance with embodiments of the present technology. It is appreciated that while FIG. 10 illustrates different embodiments of a tundish and stopper rod assembly than FIGS. 7-9, the tundish 420 and the stopper rod assembly 980 illustrated in FIGS. 7-9 can be assembled together in a similar manner. In the illustrated embodiment, the tundish 1040 includes a tundish body 1041, a cover 1048 disposed over the tundish body 1041, and an overflow channel 1045 removably coupled to the front of the tundish body 1041. The stopper rod assembly 1050 can include a mounting frame 1051, an actuator 1056 (e.g., a linear actuator) secured to the mounting frame 1051, a vertical member 1052 coupled to and extending upward from the actuator 1056, a horizontal member 1054 extending horizontally from the upper tip of the vertical member 1052, and a stopper rod 1058 coupled to and extending downward from the distal tip of the horizontal member 1054. As shown, the mounting frame 1051 can be attached to an outer side wall of the tundish body 1041 via fasteners, brackets, or other coupling mechanisms. More specifically, the mounting frame 1051 can be secured at a position aligned with an outlet 1043 of the tundish 1040. The horizontal member 1054 can extend over the sidewall of the tundish body 1041 such that the stopper rod 1058 hangs directly above the outlet 1043.

In operation, the actuator 1056 can move the vertical member 1052 between a raised position (illustrated in FIG. 10) and a lowered position. When the vertical member 1052 is in the raised position, the stopper rod 1058 is spaced apart from the outlet 1043, allowing molten metallics to flow out through the outlet 1043. When the vertical member 1052 is in the lowered position, the stopper rod 1058 can at least partially plug the outlet 1043 to impede flow of molten metallics therethrough. One of ordinary skill in the art will appreciate that the actuator 1056 can be precisely controlled to adjust the position of the stopper rod 1058 to various heights between the raised and lowered positions to plug the outlet 1043 by varying degrees. Therefore, the actuator 1056 can be controlled to provide varying levels of flow control through the outlet 1043 of the tundish 1040.

Advantageously, attaching the stopper rod assembly 1050 directly to the tundish 1040 as opposed to, e.g., a frame structure supporting the tundish 1040, can increase safety levels during operation. For example, if the stopper rod 1058 becomes stuck in the outlet 1043 or elsewhere, the tundish 1040 and the stopper rod assembly 1050 can be removed together for repair. If the stopper rod assembly 1050 were attached to another structure (e.g., a frame structure that cannot be easily removed from the on-site location), it can be difficult and unsafe to separate the tundish 1040 and the stopper rod assembly 1050 at the on-site location.

Figure 11:
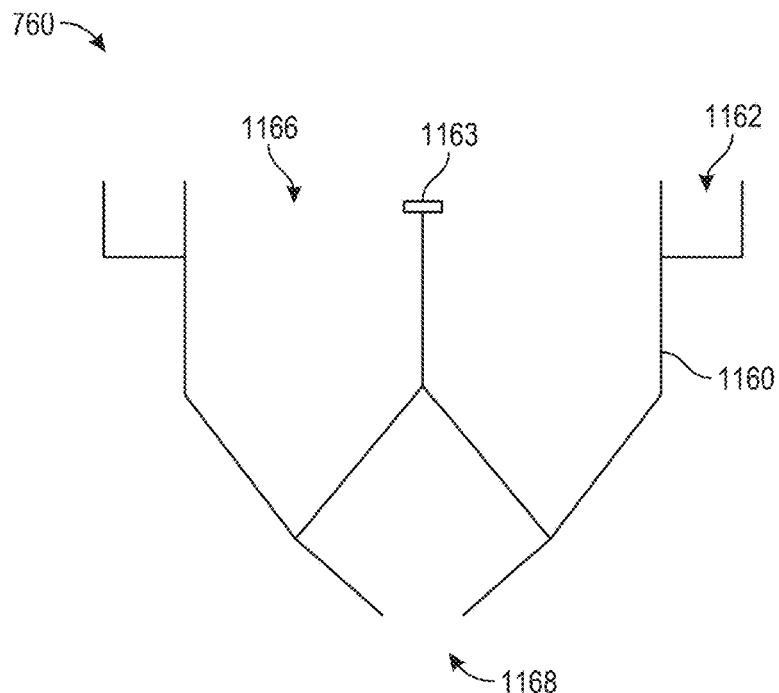
FIG. 11 is a schematic cross-sectional view of a granulation reactor configured in accordance with embodiments of the present technology.

FIG. 11 is a schematic cross-sectional view of the granulation reactor 430 configured in accordance with embodiments of the present technology. The granulation reactor 430 can include a reactor body 1160 and a spray head or target 1163 coupled to the reactor body 1160. The reactor body 1160 can define a cavity 1166 therein and an overflow channel 1162 extending around the upper portion of the cavity 1166. As illustrated, the cavity 1166 and the overflow channel 1162 can be open at the top to receive material from above. More specifically, the cavity 1166 can be positioned to receive the molten metallics flowing out of the tundish 420 through the outlet 743 and the nozzle 847. The reactor 430 can include an outlet 1168 of the cavity 1166 at the lower portion of the reactor body 1160. The overflow channel 1162 can be positioned to receive overflow material (e.g., molten metallics mixed with slag) from the tundish 420. For example, the lengths of the overflow channel 745 (of the tundish 420) can be set so that overflow materials flow down into the overflow channel 1162 (of the granulation reactor 760). The overflow materials received in the overflow channel 1162 can be removed via an outlet and sent to further processing. In some embodiments, the granulation reactor 430 further includes lifting lugs coupled to the reactor body 1160 for facilitating lifting of the granulation reactor 430 by the overhead crane 130.

The target 1163 can be secured at the center of the cavity 1166. For example, in some embodiments, the target 1163 is secured via one or more struts extending from the reactor body 1160 (e.g., like a tripod). Cooled water can enter the cavity 1166 via the reactor body 1160 and be pooled and/or circulated therein.

In operation, the granulation reactor 430 can continuously or intermittently receive cooled water from the cooling system 160 and at least partially fill the cavity 1166 with the cooled water. The volumetric capacity of the cavity 1166 can be between 10,000-100,0000 gallons or between 20,000-40,000 gallons. The molten metallics flowing down from the tundish 420 can impact the target 1163. The target 1163 can be shaped and sized to spray the molten metallics into different directions. The molten metallics that enters the cooled water is cooled and becomes granulated. One of ordinary skill in the art will appreciate that the falling distance between the tundish 420 and the target 1163 can affect the shape, size, and quality of the resulting granulated products. As discussed above, the overhead crane 130 can adjust the height of the tundish 420 relative to the target 1163 to produce granulated products with desired properties (e.g., shape, size, quality). The formed granulated products can exit the granulation reactor 430 via the outlet 1168.

Figure 12:
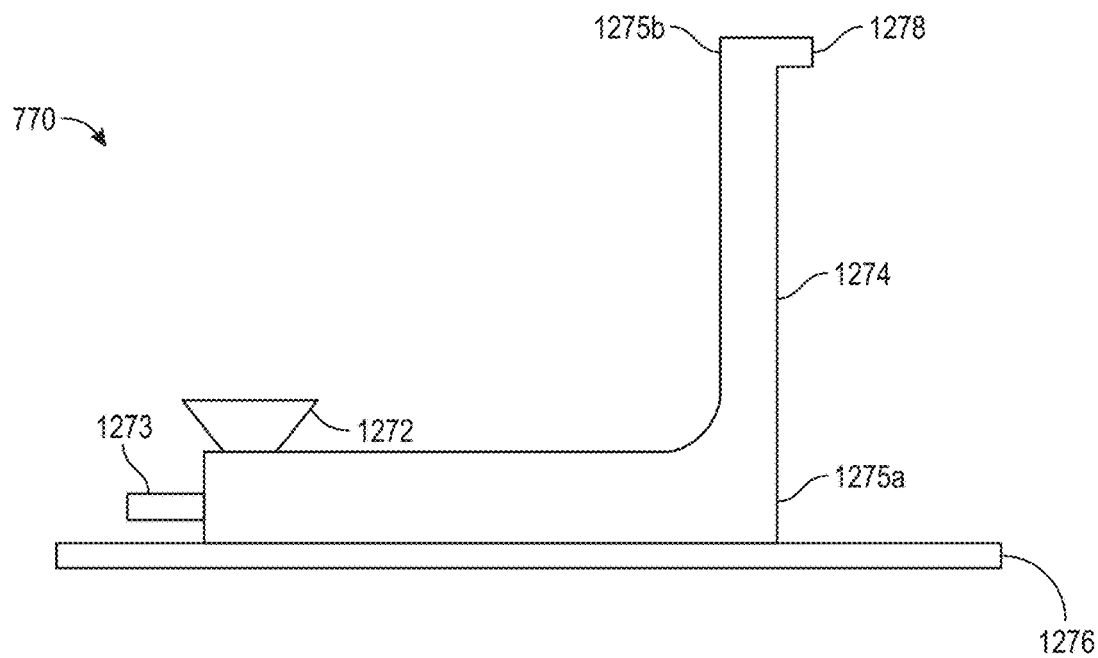
FIGS. 12A and 12B are schematic side and enlarged, side cross-sectional views, respectively, of an ejector configured in accordance with embodiments of the present technology.
Figure 12B:
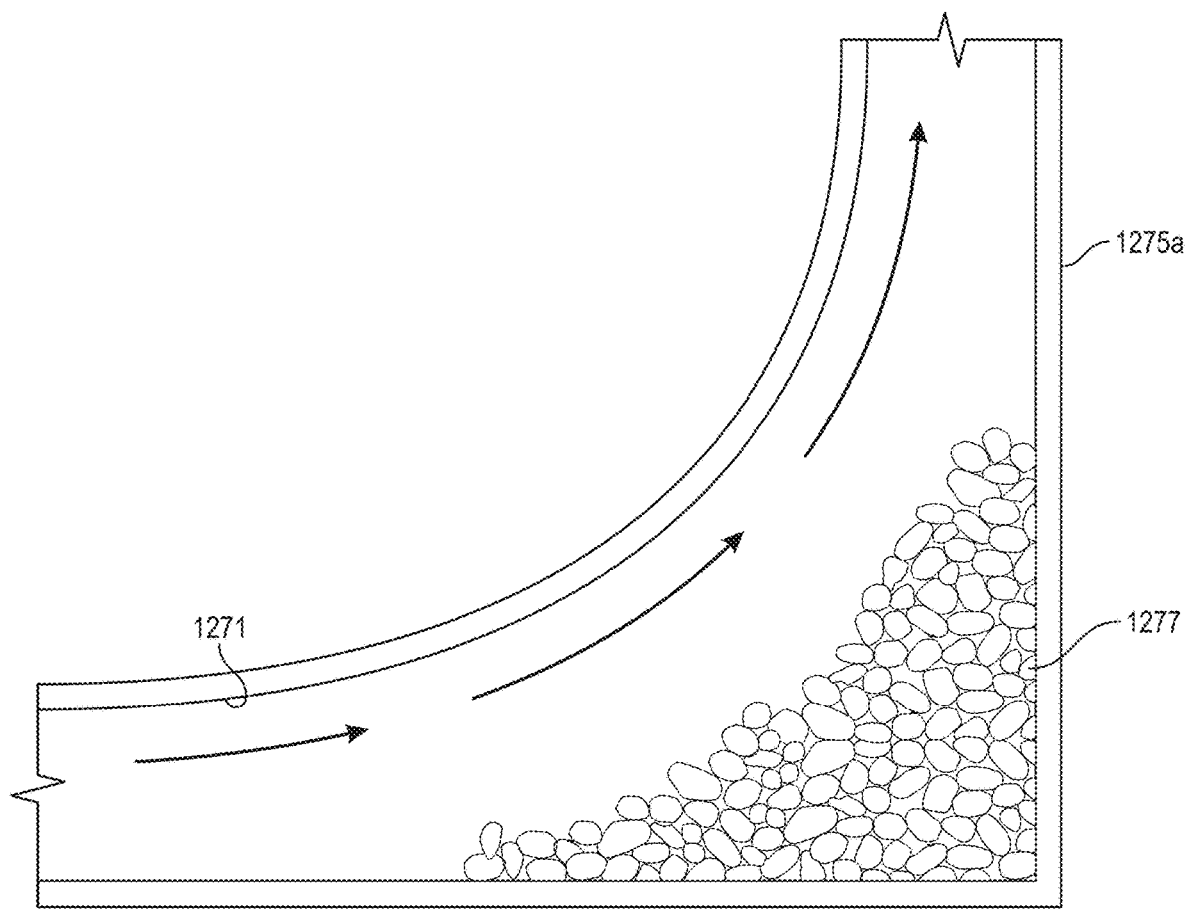

FIGS. 12A and 12B are schematic side and enlarged, side cross-sectional views, respectively, of the ejector 440 configured in accordance with embodiments of the present technology. Referring first to FIG. 12A, the ejector 40 can include an inlet 1272 and a jet inlet 1273, and the ejector 440 can be coupled to a lift line 1274 having a first rock box 1275a, a second rock box 1275b, and an outlet 1278. The inlet 1272 can be positioned at the outlet 1168 of the granulation reactor 430 to receive the granulated products therefrom. In the illustrated embodiment, the inlet 1272 has a funnel shape generally corresponding to the shape of the lower portion of the granulation reactor 430. The jet inlet 1273 can be coupled to receive a water jet stream and/or a stream of compressed air, which can provide enough pressure to push the granulated products up the lift line 1274. In the illustrated embodiment, the ejector 440 and the lift line 1274 are mounted on rails 1276, which allow the ejector 440 and the lift line 1274 to be easily removed from the granulator unit 150 for maintenance, contributing to the modularity of the granulator unit 150.

Referring next to FIG. 12B, which illustrates an enlarged, side cross-sectional view of the first rock box 1275a, the first rock box 1275a can be internally connected to the lift line 1274 where the lift line 1274 changes angle. In other words, the first rock box 1275a serves as an extended corner space or dead zone for the lift line 1274. In operation, as the granulated products from the granulation reactor 430 and the water and/or compressed air streams flow through the lift line 1274, the first rock box 1275a can collect granules 1277. The granules 1277 can remain in the corner of the first rock box 1275a by virtue of the fluid velocity and pressure. Thus, the first rock box 1275a can help reduce wear and tear on the lift line 1274 by managing the impact and abrasion caused by the granulated products changing direction, and the buildup of the granules 1277 can act as a buffer to absorb the impact of incoming material and reduce the velocity of the flow. In some embodiments, the lift line 1274 is lined with a liner material 1271 such as ceramic, silicon carbide, titanium, tungsten carbide, and/or other suitable material.

Figure 13:
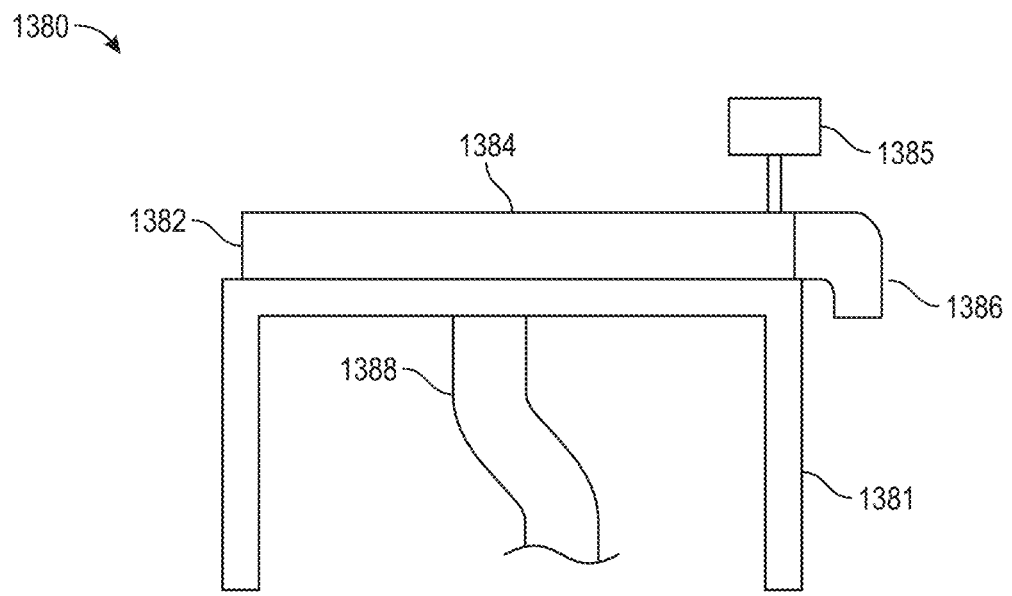
FIG. 13 is a schematic side view of a dewatering assembly configured in accordance with embodiments of the present technology.

FIG. 13 is a schematic side view of the dewatering assembly 460 configured in accordance with embodiments of the present technology. The dewatering assembly 460 can include a frame structure 1381, a dewatering screen 1384 supported on the frame structure 1381, and an imaging device 1385 positioned to capture images of the products on the dewatering screen 1384. The outlet 1278 of the lift line 1274 can couple to an inlet 1382 of the dewatering assembly 460 so that the dewatering screen 1384 can receive wet granulated products from the granulation reactor 430 via the ejector 440. The dewatering assembly 460 can further include an outlet chute 1386 at the end of the dewatering screen 1384 so that the screened products can be collected separately.

In operation, as the granulated products from the lift line 1274 move from the inlet 1382 to the outlet chute 1386, the dewatering screen 1384 can filter out water and particles below a threshold size. The threshold size can be between 0.1-10 mm, such as about 0.1 mm, 1 mm, 2 mm, 3 mm, 4 mm, 5 mm, 6 mm, 7 mm, 8 mm, 9 mm, or 10 mm. The filtered out particles can be directed to the classifier assembly 470 via a pipe 1388 underneath the dewatering screen 1384, and the products that reach the outlet chute 1386 can form the GMU products. In some embodiments, the imaging device 1385 can be used to perform optical granulometry, which involves visually inspecting the size distribution of the particles. If the particles are generally smaller than expected or desired, this may be an indication that the flow rate of the molten metallics is too fast. Accordingly, the images taken by the imaging device 1385 can be used in a feedback loop with components of the system 100 that manage flow rate, such as (i) the controller 612 for controlling the tilt angle of the transfer vessel 122, (ii) controllers for adjusting the position of the flow control devices 845 in the tundish 420, (iii) the motor 985 or the actuator 1056 for adjusting the height of the stopper rod 988 or 1058, and/or (iv) the overhead crane 130 for adjusting the height of the tundish 420 relative to the granulation reactor 430.

Figure 14:
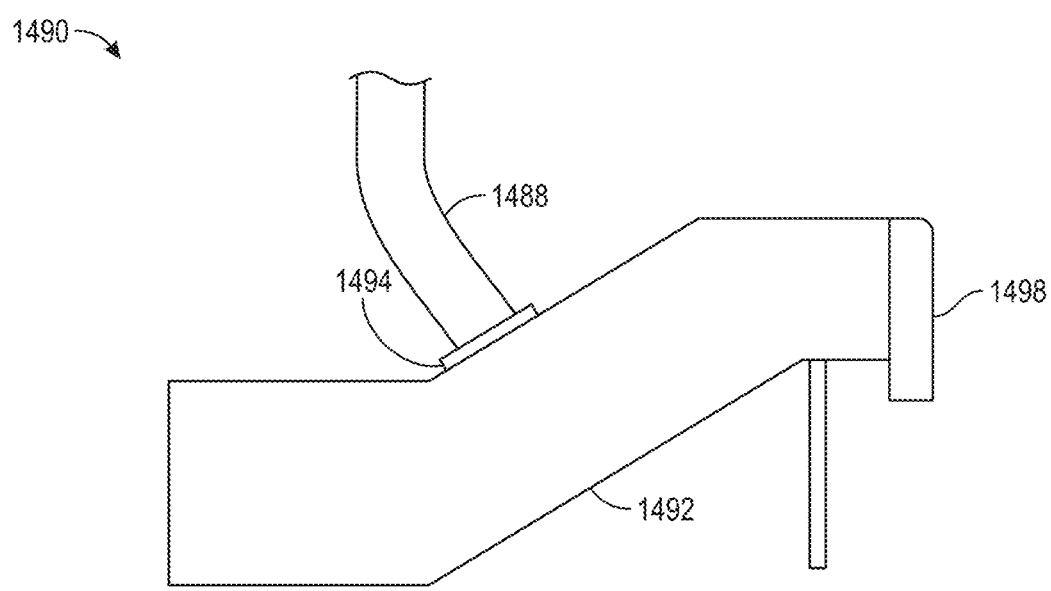
FIG. 14 is a schematic side view of a classifier assembly configured in accordance with embodiments of the present technology.

FIG. 14 is a schematic side view of the classifier assembly 470 configured in accordance with embodiments of the present technology. The classifier assembly 470 can include a housing 1492 having an inlet 1494 that can couple to the pipe 1388 and an outlet chute 1498. In operation, the inlet 1494 can receive the slurry (e.g., water and GMU fines) from the dewatering assembly 460 via the pipe 1388. The GMU fines can be separated and released through the outlet chute 1498 to be collected separately. The remaining water can be directed to, e.g., the return water sump 202.

Figure 15:
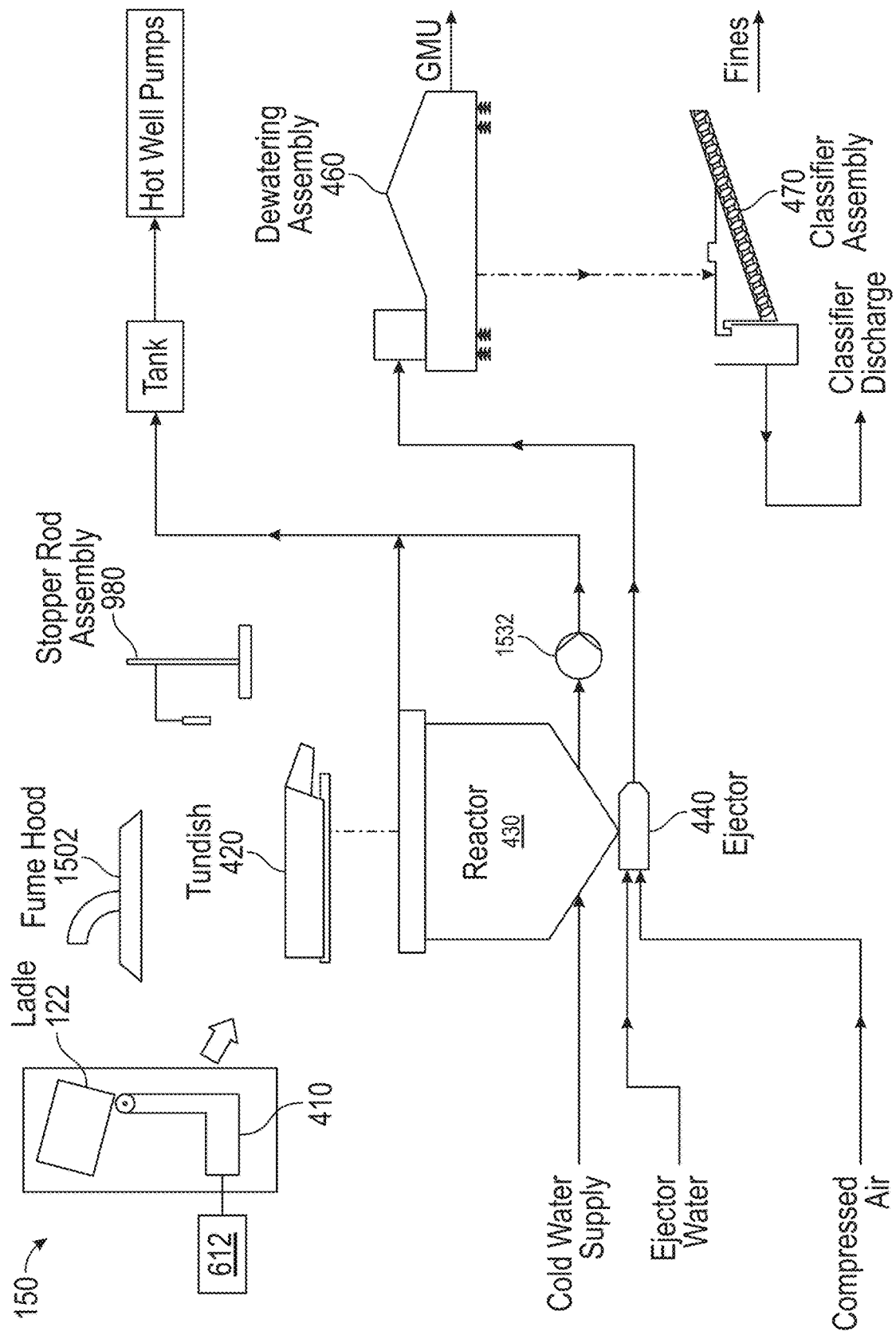
FIG. 15 is a schematic process flow diagram illustrating granulation of iron in accordance with embodiments of the present technology.

FIG. 15 is a schematic process flow diagram illustrating granulation of metal in accordance with embodiments of the present technology. The transfer vessel 122 can transport molten metallics from the blast furnace 102 and/or the desulfurization unit 140 to the granulation unit 150 (see FIG. 1). The controller 612 can operate the tilter 410 to control the tilt angle of the transfer vessel 122 to transfer (e.g., pour) the molten metallics from the transfer vessel 122 to the tundish 420 at a desired flow rate. The transfer vessel 122 can include a slide gate or valve with associated controls. In some embodiments, the granulator unit 150 further includes a trough, bucket, tray, or other collector positioned below the transfer vessel 122 and/or the tundish 420 to receive any molten metallics or other material that may spill. A fume hood 1502 can be positioned to collect emissions from the molten metallics flowing through the tundish 420. The stopper rod assembly 980 can be coupled to the tundish 420 and operated to control the flow of molten metallics out of the tundish 420 and into the granulation reactor 430.

The granulation reactor 430 can receive cool water from a cold water supply. The molten metallics exiting the tundish 420 can impact a target of the granulation reactor 430 to be sprayed over the water pooled inside the granulation reactor 430. The granulation reactor 430 can granulate the molten metallics to form granulated products, such as by cooling the molten metallics. The heated water can be sent to a tank, hot well pumps, and eventually return to the cooling system 160. In some embodiments, a drain pump 1532 is included between the granulation reactor 430 and the tank for maintenance purposes. The ejector 440 can receive ejector water and/or compressed air to transfer the granulated products from the granulation reactor 430 to the dewatering assembly 460. The dewatering assembly 460 can dry and filter (e.g., by size) the granulated products to output GMUs products. In some embodiments, the granulator units 150 are configured to produce GMUs at a rate that matches an output rate of the blast furnace 102. The filtrate from the dewatering assembly 460 can be sent to the classifier assembly 470, which can sort out and output GMU fines. The classifier discharge (e.g., remaining water and particulates therein) can be directed to the return water sump 202 or other processing. The various components of the granulator units 150 can be powered electrically, hydraulically, and/or via other methods.

III. Methods for Producing GMUs

Figure 16:
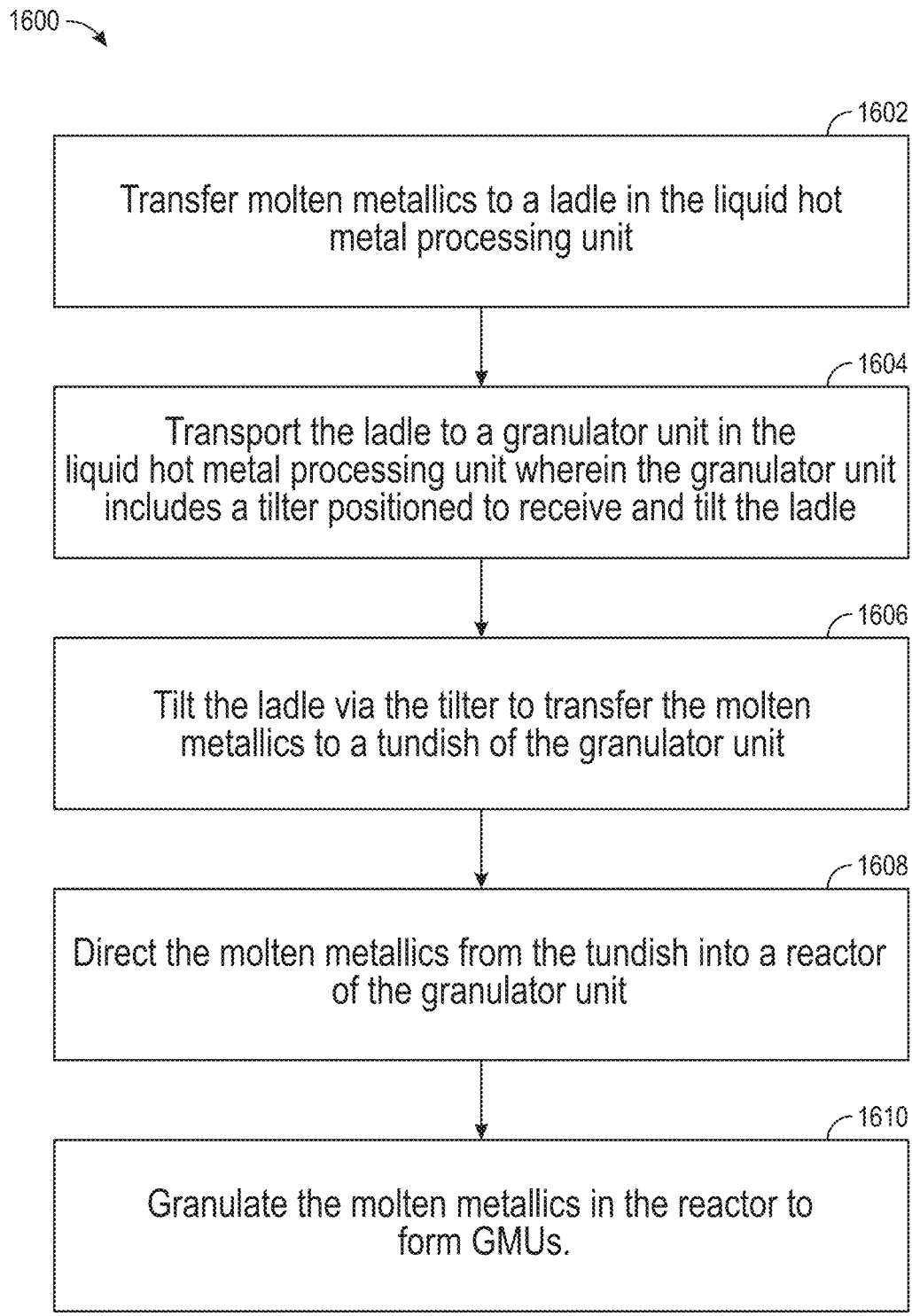
FIG. 16 is a flowchart illustrating a method for producing GMUs in accordance with embodiments of the present technology.

FIG. 16 is a flowchart illustrating a method 1600 for producing GMUs at a liquid hot metal processing unit in accordance with embodiments of the present technology. While the steps of the method 1600 are described below in a particular order, one or more of the steps can be performed in a different order or omitted, and the method 1600 can include additional and/or alternative steps. Additionally, although the method 1600 may be described below with reference to the embodiments of the present technology described herein, the method 1600 can be performed with other embodiments of the present technology.

The method 1600 begins at block 1602 by transferring molten metallics to a ladle in the liquid hot metal processing unit. In some embodiments, transferring comprises operating a torpedo car to transfer the molten metallics from a blast furnace external to the liquid hot metal processing unit to the ladle in the liquid hot metal processing unit.

At block 1604, the method 1600 continues by transporting the ladle to a granulator unit in the liquid hot metal processing unit. The granulator unit can include a tilter positioned to receive and tilt the ladle. In some embodiments, the liquid hot metal processing unit includes a plurality of granulator units and transporting can comprise transporting the ladle to one of the plurality of granulator units. In some embodiments, transporting comprises operating an overhead crane in the liquid hot metal processing unit to transport the ladle to the granulator unit.

At block 1606, the method 1600 continues by tilting, using the tilter, the ladle to transfer the molten metallics to a tundish of the granulator unit. For example, the tilter can include a linear actuator, and a controller operably coupled to the linear actuator can be used to tilt the ladle in a controlled manner to achieve a desired flow rate of molten metallics to the tundish.

At block 1608, the method 1600 continues by directing the molten metallics from the tundish into a reactor of the granulator unit. In some embodiments, the method 1600 further comprises moving (e.g., dithering) a stopper rod to control a flow rate of the molten metallics out of an outlet of the tundish.

At block 1610, the method 1600 continues by granulating the molten metallics in the reactor to form granulated metallic units (GMUs). For example, the reactor can hold cooled water and the molten metallics can be dropped, poured, sprayed, or otherwise transferred into the water so that the molten metallics can cool and become GMUs.

In some embodiments, prior to block 1602, the method 1600 further comprises feeding the molten metallics to a BOF vessel in the liquid hot metal processing unit, and delivering oxygen to the molten metallics in the BOF vessel. The molten metallics can subsequently be transferred from the BOF vessel to the ladle. Delivering oxygen can comprise heating and/or reducing a carbon content of the molten metallics in the BOF vessel. In some embodiments, the method 1600 further comprises reducing a sulfur content of the molten metallics, such as by adding at least one of calcium carbide or magnesium to the molten metallics.

IV. Examples

The present technology is illustrated, for example, according to various aspects described below as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

1. A liquid hot metal processing system for producing granulated metallic units (GMUs), the system comprising:
   a liquid hot metal processing unit including:
   a granulator unit including:
   a tilter positioned to receive a ladle,
   a controller operably coupled to the tilter to control a tilt of the ladle,
   a tundish positioned to receive molten metallics from the ladle, and
   a reactor positioned to receive the molten metallics from the tundish, wherein the reactor is configured to cool the molten metallics and form GMUs.
2. The system of any of the examples herein, wherein the liquid hot metal processing unit further includes:
   the ladle configured to receive and store the molten metal; and
   an overhead crane configured to transfer the ladle to and from the tilter.
3. The system of any of the examples herein, wherein the liquid hot metal processing unit further includes:
   a basic oxygen furnace (BOF) vessel configured to receive the molten metal; and
   an oxygen lance insertable into the BOF vessel to deliver oxygen gas to the molten metal.
4. The system of any of the examples herein, wherein the liquid hot metal processing unit further includes an oxygen lance configured to deliver oxygen gas to the molten metal, and wherein the oxygen gas is configured to react with carbon in or on the molten metallics to heat the molten metal.
5. The system of any of the examples herein, wherein the liquid hot metal processing unit further includes an oxygen lance configured to deliver oxygen gas to the molten metal, and wherein the oxygen gas is configured to react with carbon in or on the molten metallics to reduce a carbon content of the molten metal.
6. The system of any of the examples herein, wherein the liquid hot metal processing unit further includes a desulfurization unit configured to reduce a sulfur content of the molten metal.
7. The system of any of the examples herein, wherein the liquid hot metal processing unit further includes a desulfurization unit configured to reduce a sulfur content of the molten metal, and wherein the desulfurization unit is configured to reduce the sulfur content of the molten metallics by providing at least one of calcium carbide or magnesium to the molten metal.
8. The system of any of the examples herein, wherein the ladle comprises a first ladle, wherein the granulator unit comprises a first granulator unit, and wherein the liquid hot metal processing unit further includes a second ladle and a second granulator unit positioned adjacent to the first granulator unit, wherein the second granulator unit includes:
   a second tilter positioned to receive and tilt the second ladle;
   a second controller operably coupled to the second tilter to control tilting of the second ladle;
   a second tundish positioned to receive the molten metallics from the second ladle; and
   a second reactor positioned to receive the molten metallics from the second tundish, wherein the second reactor is configured to cool the molten metallics to form granulated metallic units (GMUs).
9. The system of any of the examples herein, wherein the granulator unit further includes a stopper rod assembly coupled to the tundish, wherein the stopper rod assembly include a stopper rod and an actuator operably coupled to move the stopper rod into and out of an outlet of the tundish.
10. The system of any of the examples herein, wherein the granulator unit further includes an ejector positioned to receive the GMUs from the reactor and a lift line downstream of the reactor, wherein lift line includes a curved region, and wherein the ejector further includes a rock box at the curved region, wherein the rock box is configured to receive and store a portion of the GMUs received in the ejector.

11. The system of any of the examples herein, wherein the granulator unit further includes an ejector positioned to receive the GMUs from the reactor and a lift line downstream of the reactor, wherein an inner surface of the lift line is lined with a liner material comprising ceramic, silicon carbide, titanium, and/or tungsten carbide.

12. The system of any of the examples herein, wherein the granulator unit further includes a dewatering assembly positioned downstream of the reactor, wherein the dewatering assembly is configured to dry the GMUs and filter the GMUs by size.

13. The system of any of the examples herein, wherein the dewatering assembly is configured to filter out GMU fines less than 1 millimeter in size.

14. The system of any of the examples herein, wherein the granulator unit further includes an imaging device positioned to capture images of the GMUs on the dewatering assembly, wherein the images captured by the imaging device are configured to be used in an optical granulometry feedback system to adjust a flow rate of the molten metallics into the reactor.

15. The system of any of the examples herein, wherein the granulator unit further includes a classifier assembly positioned downstream of the dewatering assembly, wherein the classifier assembly is configured to classify filtrate received from the dewatering assembly and output GMUs fines.

16. The system of any of the examples herein, wherein the granulator unit further includes:
a dewatering assembly positioned downstream of the reactor; and
a classifier assembly positioned downstream of the dewatering assembly,
wherein the overhead crane is further configured to selectively and individually lift the tundish, the reactor, the dewatering assembly, or the classifier assembly.

17. The system of any of the examples herein, wherein the liquid hot metal processing unit further includes a dust collection unit, and wherein the granulator unit further includes a fume hood positioned to collect emissions from the tundish and direct the emissions to the dust collection unit.

18. The system of any of the examples herein, wherein the liquid hot metal processing unit further includes a transfer vessel preparation unit configured to deslag and dekish the ladle.

19. The system of any of the examples herein, wherein the liquid hot metal processing unit further includes a cooling system configured to provide cooled water to the reactor.

20. The system of any of the examples herein, further comprising:
a blast furnace configured to melt iron ore to output the molten metal; and
a torpedo car configured to transport the molten metallics from the blast furnace to the liquid hot metal processing unit.

21. A method for producing granulated metallic units (GMUs) at a liquid hot metal processing unit, the method comprising:
transferring molten metallics to a ladle in the liquid hot metal processing unit;
transporting the ladle to a granulator unit in the liquid hot metal processing unit, wherein the granulator unit includes a tilter positioned to receive and tilt the ladle;
tilting the ladle via the tilter to transfer the molten metallics to a tundish of the granulator unit;
directing the molten metallics from the tundish into a reactor of the granulator unit; and granulating the molten metallics in the reactor to form GMUs.

22. The method of any of the examples herein, further comprising:
feeding the molten metallics to a basic oxygen furnace (BOF) vessel in the liquid hot metal processing unit; and
delivering oxygen to the molten metallics in the BOF vessel to form decarbonated molten metal,
wherein transferring comprises transferring the decarbonated molten metallics from the BOF vessel to the ladle.

23. The method of any of the examples herein, wherein delivering oxygen comprises heating the molten metallics in the BOF vessel.

24. The method of any of the examples herein, wherein delivering oxygen comprises reducing a carbon content of the molten metallics in the BOF vessel.

25. The method of any of the examples herein, wherein transporting comprises transporting the ladle to one of a plurality of granulator units in the liquid hot metal processing unit.

26. The method of any of the examples herein, further comprising reducing a sulfur content of the molten metal.

27. The method of any of the examples herein, wherein reducing the sulfur content comprises adding at least one of calcium carbide or magnesium to the molten metal.

28. The method of any of the examples herein, further comprising moving a stopper rod to control a flow rate of the molten metallics out of an outlet of the tundish.

29. The method of any of the examples herein, wherein transporting comprises operating an overhead crane in the liquid hot metal processing unit to transport the ladle to the granulator unit.

30. The method of any of the examples herein, wherein transferring comprises operating a torpedo car to transfer the molten metallics from a blast furnace external to the liquid hot metal processing unit to the ladle in the liquid hot metal processing unit.

V. Conclusion

It will be apparent to those having skill in the art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology.

Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Additionally, the term "comprising," "including," and "having" should be interpreted to mean including at least the recited feature(s) such that any greater number of the same feature and/or additional types of other features are not precluded.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing concentrations, shear strength, and other numerical values used in the specification and claims, are to be understood as being modified in all instances by the term "about." "About" as used herein can represent a range of plus or minus 10% of the stated value. Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

We claim:

1. A liquid hot metal processing system for producing granulated metallic units (GMUs), the system comprising:
    a liquid hot metal processing unit including:
        a granulator unit including:
            a tilter positioned to receive a ladle,
            a controller operably coupled to the tilter to control a tilt of the ladle,
            a tundish positioned to receive molten metallics from the ladle, and
            a reactor positioned to receive the molten metallics from the tundish, wherein the reactor is configured to cool the molten metallics and form the GMUs,
            an ejector positioned to receive GMUs from the reactor, and
            a lift line downstream of the reactor, wherein the lift line includes a rock box configured to receive and store a portion of the GMUs received by the ejector.

2. The system of claim 1, wherein the liquid hot metal processing unit further includes:
    the ladle configured to receive and store the molten metallics; and
    an overhead crane configured to transfer the ladle to and from the tilter.

3. The system of claim 1, wherein the liquid hot metal processing unit further includes:
    a basic oxygen furnace (BOF) vessel configured to receive the molten metallics; and
    an oxygen lance insertable into the BOF vessel to deliver oxygen gas to the molten metallics.

4. The system of claim 1, wherein the liquid hot metal processing unit further includes an oxygen lance configured to deliver oxygen gas to the molten metallics, and wherein the oxygen gas is configured to react with carbon in or on the molten metallics to reduce a carbon content of the molten metallics.

5. The system of claim 1, wherein the liquid hot metal processing unit further includes a desulfurization unit configured to reduce a sulfur content of the molten metallics, and wherein the desulfurization unit is configured to reduce the sulfur content of the molten metallics by providing at least one of calcium carbide or magnesium to the molten metallics.

6. The system of claim 1, wherein the ladle comprises a first ladle, wherein the granulator unit comprises a first granulator unit, and wherein the liquid hot metal processing unit further includes a second ladle and a second granulator unit positioned adjacent to the first granulator unit, wherein the second granulator unit includes:
    a second tilter positioned to receive and tilt the second ladle;
    a second controller operably coupled to the second tilter to control tilting of the second ladle;
    a second tundish positioned to receive the molten metallics from the second ladle; and
    a second reactor positioned to receive the molten metallics from the second tundish, wherein the second reactor is configured to cool the molten metallics to form granulated metallic units (GMUs).

7. The system of claim 1, wherein the granulator unit further includes a stopper rod assembly coupled to the tundish, wherein the stopper rod assembly include a stopper rod and an actuator operably coupled to move the stopper rod into and out of an outlet of the tundish.

8. The system of claim 1, wherein the lift line includes a curved region, and wherein the rock box is at the curved region.

9. The system of claim 1, wherein the granulator unit further includes a dewatering assembly positioned downstream of the reactor, wherein the dewatering assembly is configured to filter out GMU fines less than 1 millimeter in size.

10. The system of claim 1, wherein the granulator unit further includes a dewatering assembly positioned downstream of the reactor, wherein the granulator unit further includes an imaging device positioned to capture images of the GMUs on the dewatering assembly, wherein the images captured by the imaging device are configured to be used in an optical granulometry feedback system to adjust a flow rate of the molten metallics into the reactor.

11. The system of claim 1, wherein the granulator unit further includes a dewatering assembly positioned downstream of the reactor, wherein the granulator unit further includes a classifier assembly positioned downstream of the dewatering assembly, wherein the classifier assembly is configured to classify filtrate received from the dewatering assembly and output GMUs fines.

12. The system of claim 1, wherein the liquid hot metal processing unit further includes a transfer vessel preparation unit configured to deslag and dekish the ladle.

13. The system of claim 1, further comprising:
- a blast furnace configured to melt iron ore to output the molten metallics; and
- a torpedo car configured to transport the molten metallics from the blast furnace to the liquid hot metal processing unit.

* * * * *

UNITED STATES PATENT AND TRADEMARK OFFICE
CERTIFICATE OF CORRECTION

| | | |
|---|---|---|
| PATENT NO. | : 12,403,529 B2 | Page 1 of 1 |
| APPLICATION NO. | : 18/882661 | |
| DATED | : September 2, 2025 | |
| INVENTOR(S) | : John Francis Quanci et al. | |

It is certified that error appears in the above-identified patent and that said Letters Patent is hereby corrected as shown below:

On the Title Page

On Page 3, Column 1 (Other Publications), Line 4, delete "Granshot ©" and insert --Granshot©-- therefor.
On Page 3, Column 1 (Other Publications), Line 15, delete "Granshot ©" and insert --Granshot©-- therefor.

In the Specification

In Column 14, Line 61 (Detailed Description), delete "40" and insert --440-- therefor.

In the Claims

In Column 21, Line 64, Claim 1, after "ladle,", delete "and".

Signed and Sealed this
Fourth Day of November, 2025

John A. Squires
*Director of the United States Patent and Trademark Office*